US010931889B1

(12) United States Patent
Barone et al.

(10) Patent No.: US 10,931,889 B1
(45) Date of Patent: Feb. 23, 2021

(54) SYSTEM AND METHOD FOR PROVIDING LANDSCAPE AND PORTRAIT ORIENTED IMAGES OF A COMMON SCENE ON SEPARATE FEEDS WITH INDEPENDENT IMAGE CONTROLS

(71) Applicant: Disney Enterprises, Inc., Burbank, CA (US)

(72) Inventors: Erik Barone, Burbank, CA (US); Samuel J. Reisner, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/881,470

(22) Filed: May 22, 2020

(51) Int. Cl.
*H04N 5/247* (2006.01)
*H04N 5/232* (2006.01)
*H04N 5/265* (2006.01)

(52) U.S. Cl.
CPC ......... *H04N 5/247* (2013.01); *H04N 5/23203* (2013.01); *H04N 5/23299* (2018.08); *H04N 5/265* (2013.01)

(58) Field of Classification Search
CPC ................. G06T 7/73; G06T 2207/10; G06T 2207/10141; G06T 2207/30221; G06T 2207/30244; H04N 5/247; H04N 5/23203; H04N 5/23299; H04N 5/265
See application file for complete search history.

(56) References Cited

U.S. PATENT DOCUMENTS

| 10,728,459 | B2* | 7/2020 | Gumpert | G08B 13/1963 |
| 10,791,275 | B2* | 9/2020 | Troy | F03D 17/00 |
| 2006/0126738 | A1* | 6/2006 | Boice | H04N 5/23299 375/240.16 |
| 2011/0058036 | A1* | 3/2011 | Metzger | H04N 7/181 348/143 |
| 2012/0007845 | A1* | 1/2012 | Tsuida | H04N 9/3147 345/207 |
| 2016/0381261 | A1* | 12/2016 | Bontrager | H04N 5/2624 348/375 |
| 2017/0363949 | A1* | 12/2017 | Valente | H04N 13/161 |
| 2019/0364206 | A1* | 11/2019 | Dal Mutto | G06T 7/73 |
| 2020/0267328 | A1* | 8/2020 | Jeung | H04N 13/243 |

* cited by examiner

*Primary Examiner* — Chiawei Chen
(74) *Attorney, Agent, or Firm* — McCormick, Paulding & Huber PLLC

(57) ABSTRACT

A system and method for providing landscape (horizontal) and portrait (vertical) oriented images of a common scene on separate feeds with independent image controls includes a movable horizontal camera configured to provide a horizontal image on a horizontal image feed, a movable vertical camera configured to provide a vertical image on a vertical image feed, the horizontal and vertical cameras configured to be aligned along a camera axis and mounted to a common support, the horizontal and vertical cameras configured to view the common scene and to provide separate horizontal and vertical image feeds simultaneously, the cameras being independently controlled such that a given camera is moved when a tracked subject exceeds a control range threshold for that camera image, independent of the subject location in the other camera image. In some embodiments, a single high resolution image may be used with independently-controlled horizontal and vertical extracted images.

31 Claims, 11 Drawing Sheets

Camera Settings Table

| | Vertical Camera (V-Cam) | | | | | | Horizontal Camera (V-Cam) | | | | | |
| | Defaults | | | Range Control | | | Defaults | | | Range Control | | |
| | DPv | DTv | DZv | NPv | NTv | NZv | DPh | DTh | DZh | NPh | NTh | NZh |
| Camera Assy 1 | 0 deg | 10 deg | 3:1 | 50% | 50% | 100% | 0 deg | 5 deg | 1:1 | 60% | 80% | 80% |
| Camera Assy 2 | 5 deg | 8 deg | 5:1 | 45% | 60% | 90% | 2 deg | -7 deg | 2:1 | 65% | 90% | 85% |
| Camera Assy 3 | -10 deg | 9 deg | 2:1 | 55% | 70% | 95% | -5 deg | 3 deg | 5:1 | 70% | 70% | 90% |

FIG. 6

SYSTEM AND METHOD FOR PROVIDING LANDSCAPE AND PORTRAIT ORIENTED IMAGES OF A COMMON SCENE ON SEPARATE FEEDS WITH INDEPENDENT IMAGE CONTROLS

BACKGROUND

It is known that mobile devices such as smart phones, tablets, and the like, automatically display videos and still images in portrait or landscape mode depending on the orientation of the device. For most applications, the device scales the input image or video to display according to the orientation. However, such auto-orientation (or auto-rotation) leads to a loss in image quality either due to truncation/cropping of the image or lack of full use of the available screen.

Accordingly, it would be desirable to have a method and system that overcomes these issues and provides images to be displayed in portrait and in landscape modes without losing any content or quality, and with overlays and framing appropriate for the target orientation.

BRIEF DESCRIPTION OF THE DRAWINGS

FIG. 3A top view of the system of FIG. 1 showing example panning and non-panning ranges for each camera, in accordance with embodiments of the present disclosure.

FIG. 6 is a table showing dual-mounted camera PTZ camera default value and control ranges, in accordance with embodiments of the present disclosure.

DETAILED DESCRIPTION

Figure 1:
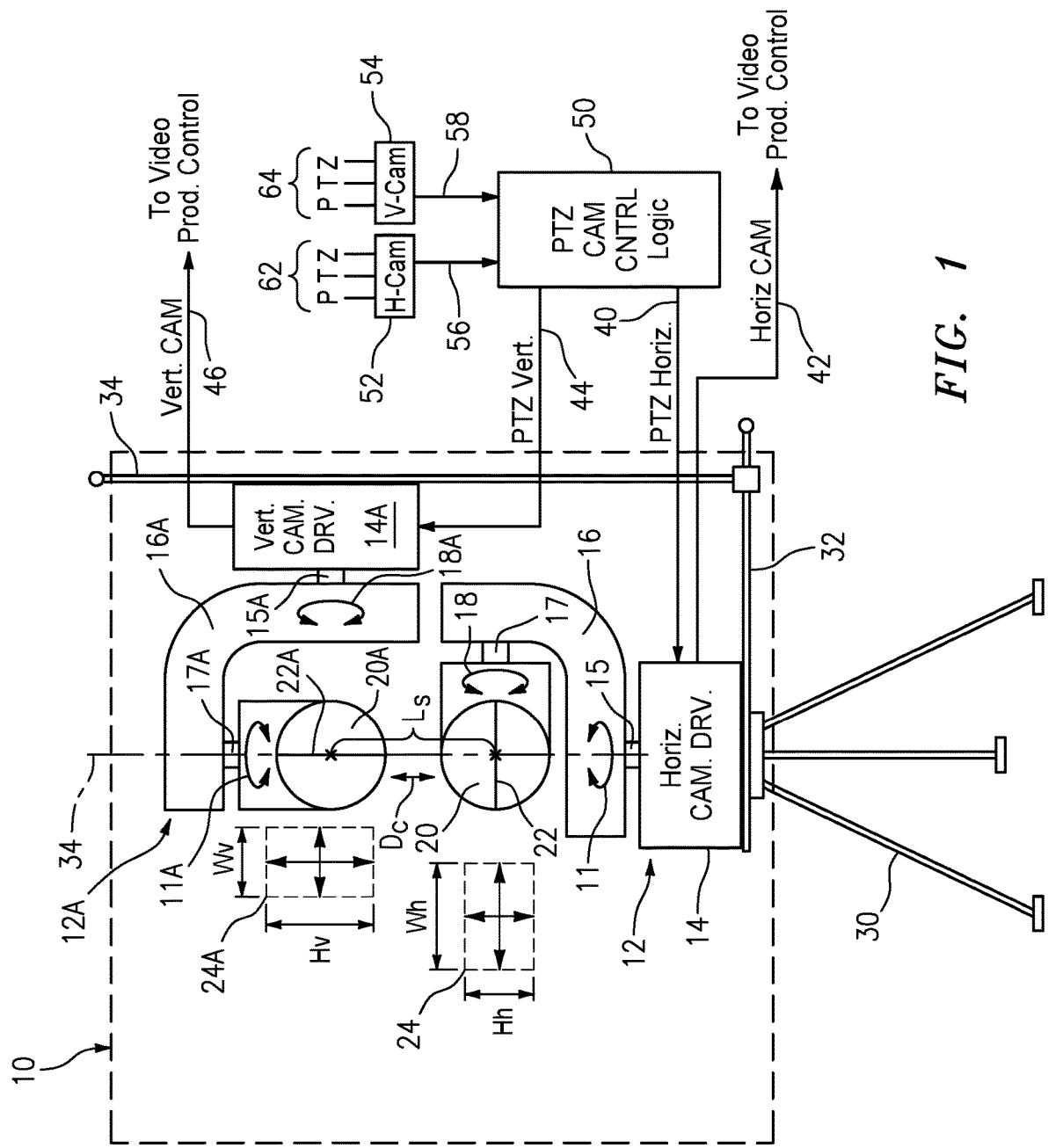
FIG. 1 is a partial rear view of dual-mounted, aligned cameras with different orientations, in accordance with embodiments of the present disclosure.

As discussed in more detail below, in some embodiments, the present disclosure is directed to a system and method for simultaneously providing rectangular landscape (horizontal) and rectangular portrait (vertical) oriented images of a common scene on separate video feeds with independent image controls. In some embodiments, a dual-camera system provides still images and videos simultaneously captured (or shot) in portrait and landscape orientations so that each view can be optimized for presentation on the respective orientation of a mobile device (e.g., smart phone, tablet, laptop or the like), television, or other display device. In particular, in some embodiments, the system of the present disclosure provides two PTZ (pan, tilt, zoom) video cameras mounted perpendicular to each other such that one PTZ camera (H-Cam) captures images in a horizontal (or landscape) format (or frame or window), and the other PTZ camera (V-Cam) captures images in a vertical (or portrait) format (or frame or window). The present disclosure also provides these two image/video formats being captured (or shot) from as close as possible to the same spatial orientation or perspective or image capture point, by minimizing spatial separation between cameras. The present disclosure also provides these two image/video formats being captured (or shot or digitally recorded) simultaneously and may be provided as a live video feed or live stream or a may be digitally stored and played back or streamed at a later date.

The present disclosure is also directed to a camera control system that tracks the on-screen subject (or on-screen talent) and automatically in real-time optimizes the two PTZ camera positions simultaneously to keep the on-screen subject (or talent) within desired horizontal and vertical boundaries of the image/video frame for each camera orientation (i.e., the V-Cam and the H-Cam). The subject or talent, as used herein may be a person (or human), animal or object, such as a sports object (e.g., ball, puck, frisbee, dart, bean bag, shuttlecock, or the like) or other object in the scene that is desired to be tracked.

In some embodiments, the system of the present disclosure also allows for such dual-orientation feeds to be provided using less expensive lower resolution cameras, e.g., 1080p or 4K video cameras, which are less expensive than a higher resolution 8K video camera or the like. The disclosure also provides videos aligned along the same axis while the cameras are oriented differently. An example of an application that uses such a dual-orientation image/video format is the Quibi video service (https://en.wikipedia.org/wiki/Quibi).

More specifically, the present disclosure provides two cameras mounted to a single tripod or other mount (such as a camera pedestal) with the second camera mounted above and axially aligned with the first camera at an orientation perpendicular to the first camera. The single tripod allows the two cameras to be moved together and oriented to be aligned along the same axis (e.g., a common vertical axis) through the center of both lenses and panning pivot points of both cameras.

In some embodiments, the two camera images (Vertical and Horizontal), may be captured by a single large high resolution camera (e.g., 8K resolution video camera), by extracting (or cropping) the appropriate framed Vertical and Horizontal images from the large high resolution image and controlling or synchronizing the two cropped images independently to provide discrete moving windows (or image frames) with the same effect as using two separate cameras.

In addition, in some embodiments, the automatic PTZ controls of the cameras are synchronized in real-time so that as the framing in one camera is adjusted, the second camera adjusts appropriately, but only when necessary to maintain the desired framing for that camera. Thus, a camera is moved (e.g., panned or tilted) only when the talent exceeds a control range threshold for that camera image, independent of the talent location in the other camera image. Such independent camera adjustments or movements, as described herein, may include thresholds so that the talent is being tracked in real-time for the portrait camera (likely due to narrowness of the width of the vertical frame), the horizontal (landscape) camera does not rock or move unnecessarily (as the horizontal camera has a wider frame width). However, when the talent approaches the edge of the horizontal frame for the horizontal camera with the pan of the vertical (portrait) camera, the horizontal camera would start to pan to keep the talent in the desired location in the horizontal image frame. In some embodiments, known computer vision on the horizontal camera (or other talent tracking sensors or technology, discussed herein) may be used to provide tracking/feedback to the vertical camera to automatically track the talent as the talent sways or moves from side-to-side in the vertical image frame. Similar talent tracking may be used in the vertical (up/down) direction, e.g., if the talent stands or sits, or makes other vertical movements.

Referring to FIG. 1, a system and method for dual-mounted, aligned cameras with different orientations of the present disclosure includes a dual-camera assembly (or set-up or set or unit) 10, which includes a horizontal PTZ video camera 12 and a vertical PTZ video camera 12A oriented perpendicular to each other and aligned along a common vertical axis 34, the common vertical axis 34 running through the camera panning motion pivot (or rotation) points 15,17A for the cameras 20,20A, respectively. The video cameras 20,20A may each be a PTZ video camera Model No. AW-UE150W/K 4K PTZ camera, made by Panasonic. Other PTZ video cameras may be used for the cameras 20,20A if desired provided they meet the function and performance requirements disclosed herein. For example, Model AW-HE42 Full-HD Professional PTZ Camera with 3G-SDI, made by Panasonic, and Model AW-UE4 Wide Angle 4K PTZ Camera with IP Streaming, made by Panasonic, may be used if desired.

The horizontal camera unit 12 includes a movable horizontal PTZ camera 20, pivotally connected to a swivel arm 16, and configured to allow the camera 20 to pivot about a pivot point 17, as shown by arrows 19, which provides a tilting motion for the horizontal camera 20. The swivel arm 16 is also pivotally connected to a horizontal camera driver 14, and configured to allow the camera 20 (and swivel arm 16) to pivot (or rotate) about a pivot point 15, as shown by arrows 11, which provides a panning motion for the horizontal camera 20.

The horizontal camera driver 14 and swivel arm 16 have the necessary motors and mechanical connections and electrical drivers and logic (which may include computer processing) and connections to cause the horizontal PTZ camera 20 to pan, tile and zoom in response to PTZ Horizontal commands (PTZ Horiz.) received on a line 40 from PTZ control logic 50, described hereinafter with FIG. 4, and to provide a digital video signal (Horiz. Cam) from the horizontal camera (H-Cam) 20 on a line 42 to a production control center logic, described hereinafter with FIG. 4. The horizontal camera driver 14 is mounted to a tripod 30.

The vertical camera unit 12A includes a movable vertical PTZ camera 20A, pivotally connected to a swivel arm 16A, and configured to allow the camera 20A to pivot about a pivot point 17A, as shown by arrows 11A (same motion as the arrows 11 for the horizontal camera 12), which provides a panning motion for the vertical camera 20A. The swivel arm 16A is also pivotally connected to a vertical camera driver 14A, and configured to allow the vertical camera 20A (and swivel arm 16A) to pivot (or rotate) about a pivot point 15A, as shown by arrows 18A (same motion as the arrows 18 for the horizontal camera 12), which provides a tilting motion for the vertical camera 20A.

The vertical camera driver 14A and swivel arm 16A have the necessary motors and mechanical connections and electrical drivers and logic (which may include a computer or processor) and connections to cause the vertical PTZ camera 20A to pan, tile and zoom in response to PTZ Vertical commands (PTZ Vert.) received on a line 44 from PTZ control logic 50, described hereinafter with FIG. 4, and to provide a digital video signal (Vert. Cam) from the vertical camera (V-Cam) 20A on a line 46 to a production control center logic, described hereinafter with FIG. 4.

The vertical camera driver 14A is rigidly mounted to a pair of vertical rails 34, which are rigidly attached to a perpendicular pair of horizontal rails 32. The horizontal rails 32 are attached to the tripod 30 and to the horizontal camera driver 14. The rods 32,34 are arranged such that the center of the lenses of the two cameras 20,20A are on the common vertical axis 34, which runs through the camera panning motion pivot points 15,17A for the cameras 20,20A, respectively.

The camera driver 14 (and the rest of the dual-camera assembly 10) is mounted to a tripod 30 or camera pedestal or other camera mount, which supports the dual-camera assembly 10 to set the overall height, tilt angle, and pan angle of the dual-camera assembly 10, and allows the overall height, tilt angle, and pan angle of the dual-camera assembly 10 to be adjusted as a single assembly to be adjusted by an on-site camera operator or cameraman (not shown), or remotely, if the tripod 30 provides for remote control of the height, tilt angle, and pan angle. The single tripod 30 allows the two PTZ cameras 20,20A to be moved together and while being aligned along the same vertical axis 34 through the center of both lenses and through the camera panning motion pivot points 15,17A, but having 90 degrees different orientation.

The horizontal camera 20 captures, records or transmits images and videos horizontally in landscape mode, having a horizontal image frame shown as a dashed-box 24 having a horizontal width Wh (along a major axis or long dimension) and horizontal height Hh (along a minor axis or short dimension), and the vertical camera 20A captures, records, or transmits images and videos vertically in portrait mode, having a vertical image frame shown as a dashed-box 24A having a vertical width Wv (along a minor axis or short dimension) and vertical height Hv (along a major axis or long dimension). Lines 22,22A on the back of the cameras 20,20A, indicate the long dimension (or major axis or long dimension) of the orientation of the camera image frames 24,24A, respectively. Thus, the two separate cameras 20,20A have the image frames 24,24A having major axes oriented 90 degrees apart (or perpendicular) and aligned along the common camera axis 34.

The two camera units 12,12A are mounted on rails that are oriented perpendicular to each other. The two cameras 20,20A are mounted with sufficient camera separation distance Dc, e.g., about 1 to 1.5 inches, between the outer dimensions of the housings (or casings) of the two cameras 20,20A such that the two cameras 20,20A can be independently controlled/adjusted/moved without hitting or otherwise mechanically interfering with each other for pan and tilt-camera movements as the different oriented shots from the two cameras 20,20A may not have the same PTZ settings (discussed hereinafter). Also, the center of the camera lenses associated with the two cameras 20,20A are separated by a center lens separation distance Ls, e.g., about 3 to 4 inches, measured from center-to-center of the two camera lenses, for a lens diameter of about 1.5 to 3 inches and camera separation distance Dc of about 1 to 1.5 inches. Other camera separation distances Dc and center lens separation distances Ls may be used between the cameras 20,20A, if desired, provided it meets the function and performance described herein.

In some embodiments, the two cameras 20,20A are positioned as close to each other as possible, to minimize the center lens separation distance Ls, and to provide the impression (or appearance) to the viewing audience that the images of the talent from the two cameras 20,20A are both being shot (or captured) from the same (or substantially the same) perspective (or image capture point), i.e., to avoid talent "eye-line separation". Thus, it is desired that the talent appears (to the viewing audience) to be looking directly at each camera (the talent "eye-line") for both camera images. Another factor used to avoid eye-line separation is the camera shooting distance (or image capture distance) Ds from the camera lens to the talent. We have found that for the video camera type and center lens separation distance Ls discussed herein, e.g., about 3 to 4 inches, a camera shooting distance Ds (FIGS. 3A and 3B) of at least 6 feet from the talent, provides the desired viewer impression to avoid eye-line separation. Other values for the camera shooting distances Ds may be used if desired, provided it meets the function and performance described herein.

The PTZ Camera Control Logic 50 may receive manual commands from manual PTZ joystick controls such as known H-Cam PTZ joystick (or manual) control 52 and a V-Cam PTZ joystick (or manual) control 54, having PTZ joysticks 62,64, which provide signals on the lines 56,58, to manually control the horizontal camera 20 and vertical camera 20A, respectively, e.g., by a camera operator. In some embodiments, there may be a single joystick for each camera 20,20A that performs two or more of the PTZ camera functions (e.g., left/right=pan, up/down=tilt, press/lift=zoom). Also, in some embodiments, the control logic may be configured to allow a single camera joystick to follow a talent and then automatically engage the other (opposite) camera manual control in either direction, up/down (tilt) or left/right (pan), so as to allow independent control of each camera until the other camera needs to be moved to track the talent. For example, if the talent is moving to the left and exceeds the desired location in the vertical camera image frame, the camera operator may manually move the vertical camera joystick to pan left to follow the talent. If the talent continues to move left and exceeds the desired location in the horizontal camera image frame, the controller logic 50 may automatically engage the horizontal camera to begin moving the horizontal camera to pan left to follow the talent. A similar auto-engagement may exist for the up/down (tilt) controls. In that case, if the talent is moving to the up and exceeds the desired upper location in the horizontal camera image frame, the camera operator may manually move the horizontal camera joystick to tilt upward to follow the talent. If the talent continues to move upward and exceeds the desired location in the vertical camera image frame, the controller logic 50 may automatically engage the vertical camera to begin moving the vertical camera to tilt upward to follow the talent.

In some embodiments, such as that shown in FIG. 1, the same model of PTZ video camera may be used for both of the cameras 20,20A, and the vertical camera 20A is rotated 90 degrees from its standard default (factory-defined) camera orientation. In that case, the manual pan and tilt controls of the vertical camera 20A are opposite to that of the horizontal camera 20. In particular, when the vertical camera 20A is panned using its normal pan command shown in FIG. 1 as the rotation arrows 18A, it will appear as a tilt command in the output video signal of the vertical camera 20A due to the 90 degree rotation of the vertical camera 20A. Similarly, when the vertical camera 20A is tilted using its normal tilt command for the camera 20A shown in FIG. 1 as the rotation arrows 11A, it will appear as a pan command in the output video signal of the vertical camera 20A due to the 90 degree rotation of the vertical camera 20A.

Accordingly, in some embodiments, the V-Cam pan/tilt controls 54 or the PTZ Camera Control Logic 50 may be configured so that the manual pan and tilt controls of the vertical camera 20A may be swapped (or re-routed) so the V-Cam pan/tilt controls 54 for the vertical camera 20A responds as expected to a camera operator using the manual joystick controls 52,54, so the operator can move the joysticks 62,64 of each camera pan axis and have it pan the camera. This may be done, for example, by modifying the installed orientation of the joystick 64 so that it is oriented perpendicular to the joystick 62, or by adapting hardware or software in the V-Cam pan/tilt controls 54 or the PTZ Camera Control Logic 50 to route pan signals input via joystick 64 to the tilt controls of vertical camera driver 14A and the tilt controls input via joystick 64 to the pan controls of vertical camera driver 14A. Adapting hardware or software in the V-Cam pan/tilt controls 54 or the PTZ Camera Control Logic 50 to route input signals to alternate camera controls avoids the expense of re-orienting a joystick that may be installed in an expensive control console such that it is not practical to change its orientation.

If the signals are not re-routed, the operator must move the vertical PTZ joystick in the tilt axis to effectuate pan, and in the pan axis to effectuate a tilt for the vertical camera 20A. In embodiments where the manual pan and tilt control signals of the V-Cam 20A are not swapped (or re-routed), the image from the vertical camera 20A may be presented to the camera operator sideways on a video monitor that is rotated 90 degrees (i.e., positioned horizontal or landscape) so that the PTZ joystick operation may be more intuitive to the camera operator since the joystick movements will be the same for both cameras, the camera operator will be able to use coordinated movements of two joysticks to keep the subject in the frame, even though the image of the vertical camera 20A will be presented to the camera operator rotated 90 degrees from how the image will be broadcast or streamed to a viewer.

In particular, in some embodiments, a first camera control input device and a second camera control input device may be configured such that parallel motions used by a camera control operator to generate inputs from the first camera control input device and a second camera control input device generate a pan input to the horizontal camera and a tilt input to the vertical camera, and a display screen displays the talent image captured from the horizontal camera or the vertical camera to the camera control operator, the display screen oriented to present the talent image to the camera operator at an orientation consistent with the orientation of the camera that captured the talent image, and the talent image is output from the system in a manner that indicates to a user device that the talent image is to be displayed on the user device at an orientation rotated 90 degrees with respect to the orientation of the talent image as displayed on the display screen.

For example, in such embodiment, for controlling the vertical camera 20A, what would ordinarily be a tilt operation becomes a pan operation due to the orientation of the vertical camera 20A. However, in order to track the camera's physical movement to what the camera operator is expecting, by presenting the image to the camera operator sideways (e.g., on a monitor rotated 90 degrees), an "upward" movement of the joystick which pans the camera to right, will be displayed as an upward movement of the image in the 90 deg. rotated vertical display, which is intuitive to the camera operator based on the tilt joystick movements, as the camera operator is concerned with keeping the subject in the image frame rather than viewing the image as oriented for broadcast.

In some embodiments, instead of using the same model of camera for both cameras 20,20A and having one camera rotated 90 degrees from its normal default (factory-defined) orientation, the vertical camera 20A may be designed to provide a normal default orientation to operate in vertical (or portrait) format for pan/tilt camera movement. In that case, the PTZ joystick controls would not need to be swapped to provide the function described herein above.

Figure 2A:
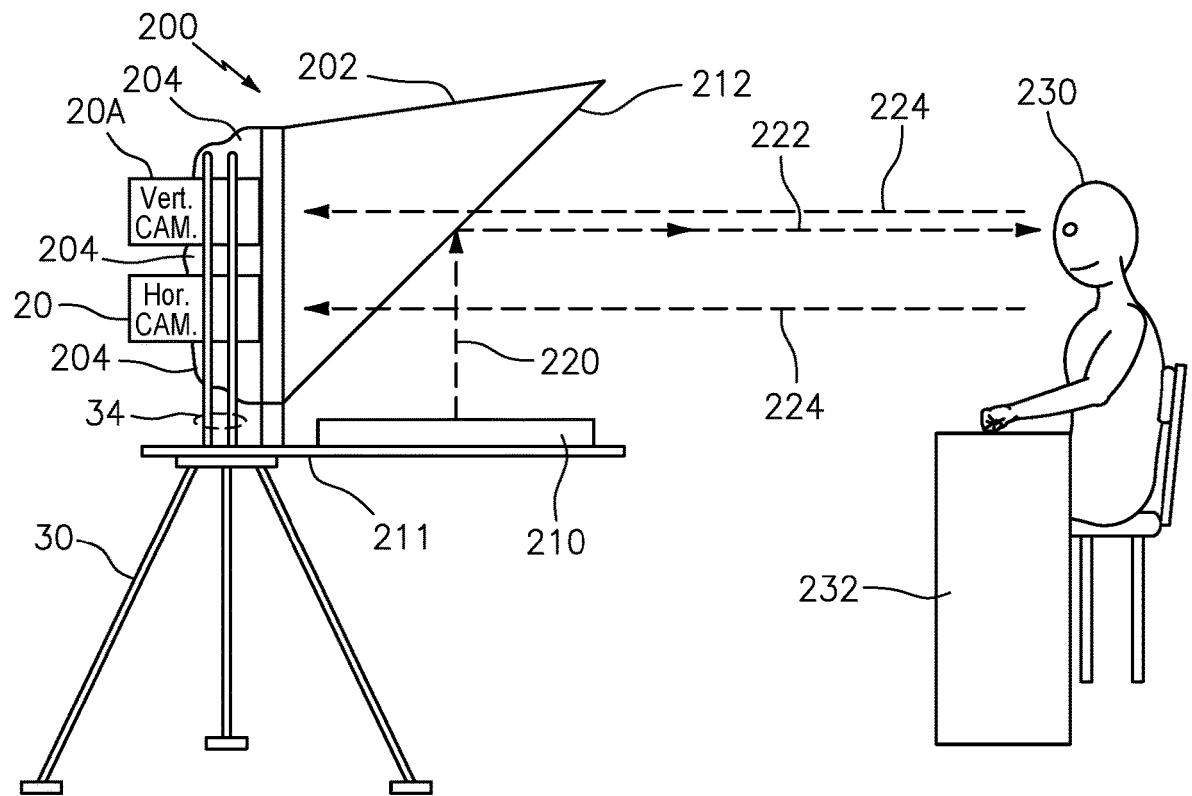
FIG. 2A is a side view of a system for dual-mounted, aligned cameras with different orientations, having a teleprompter, in accordance with embodiments of the present disclosure.
Figure 2B:
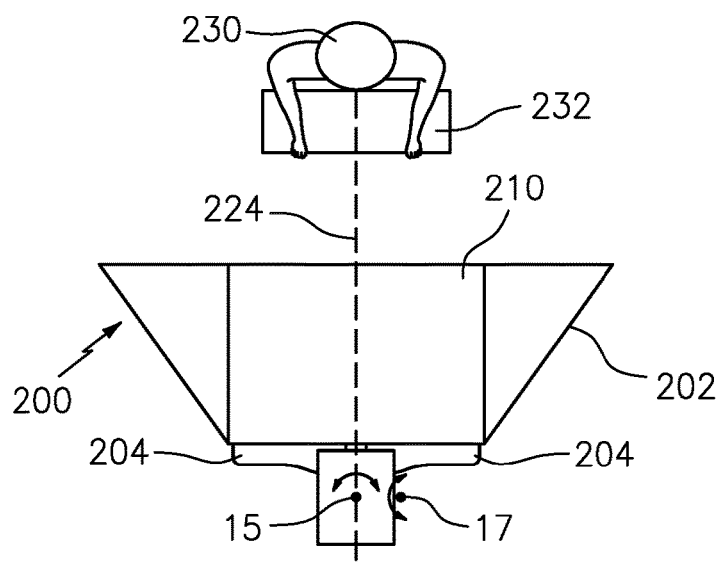
FIG. 2B is a top view of dual-mounted, aligned cameras with different orientations, having a teleprompter, in accordance with embodiments of the present disclosure.

Referring to FIGS. 2A and 2B, the system of the present disclosure may also be configured or used with an optional teleprompter system 200, e.g., Master Series Teleprompter 20 inches or 17 inches square, made by Autocue, or the like, located directly in front of the two cameras 20,20A. Other teleprompters may be used if desired. The teleprompter system 200 protects an "Eye Line" where the on-screen talent (e.g., person) 230 can view and read scripts or text from an angled, reflective screen 212, while looking straight at the cameras 20,20A for maximum engagement with the viewer audience. In particular, a horizontally-oriented display monitor 210 is rigidly attached to a horizontal monitor support tray 211 directly underneath the reflective screen 212, and the monitor 210 displays desired script for the on-screen talent 230 to read. Light 220 of the script from the monitor 210 is projected onto an angled reflective screen 212 which provides reflected light 222 of the script toward the talent 230, which allows the on-screen talent 230 to read the text on the screen 210. Also, the image light 224 of the illuminated talent passes through the angled teleprompter screen 212 allowing the cameras 20,20A to view the on-screen talent 230 but not view the script, as is known. The height of the tripod 30 is set to allow the cameras 20,20A to be at approximately eye level of the talent 230, as shown by the lines 224. The talent may be sitting or standing at a desk or podium 232, which provides the desired height of the talent. Also, there is a dark light-absorbing material or cloth shroud, e.g., black duvetyn material or black theatre fabric, or the like, around and between the cameras 20,20A to minimize the amount of light behind the cameras from being seen by the talent 230. Referring to FIG. 2B, a top view of the configuration of FIG. 2A is shown.

Figure 3A:
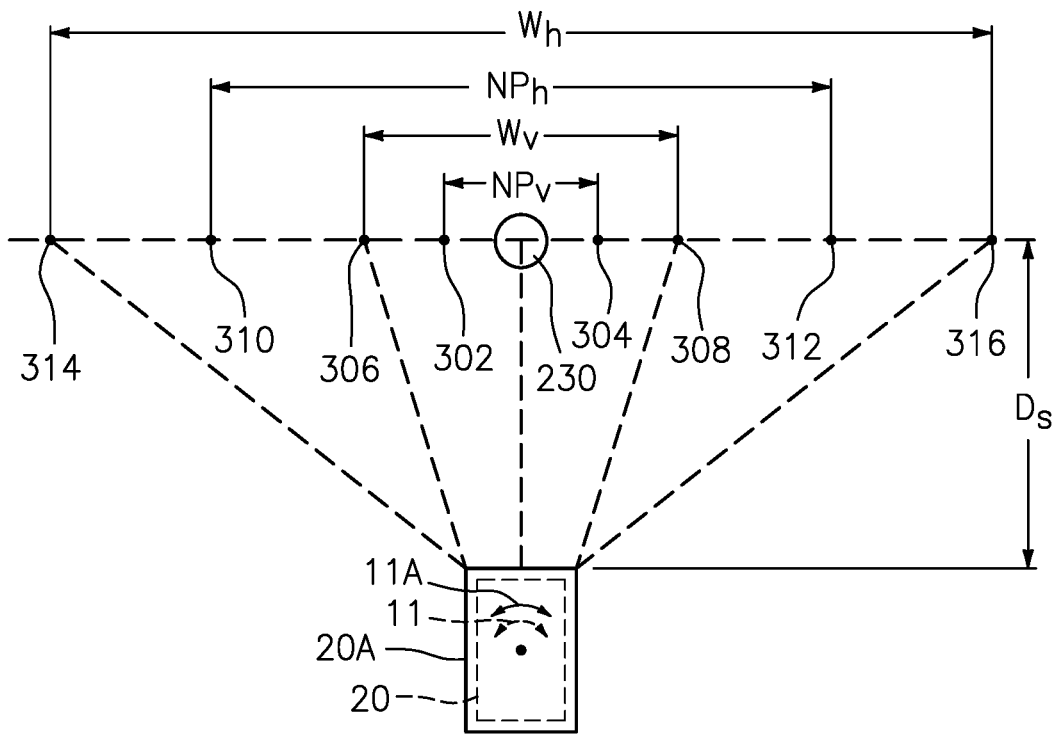
Figure 3B:
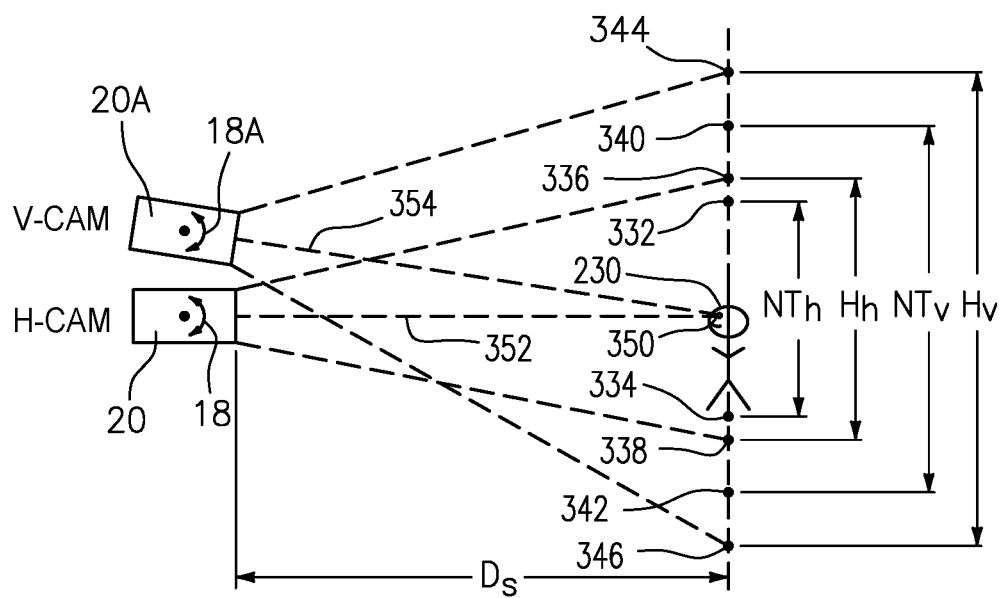
FIG. 3B side view of the system of FIG. 1 showing example tilting and non-tilting ranges for each camera, in accordance with embodiments of the present disclosure.

Referring to FIGS. 3A and 3B, the pan and tilt of both the horizontal and vertical PTZ cameras 20,20A, respectively, are independently adjusted in real-time to keep the on-screen talent 230 in the desired position within the horizontal and vertical frames 24,24A (FIG. 1). Referring to FIG. 3A, regarding pan control of the PTZ cameras 20,20A, if the cameras 20, 20A are pointed at the talent 230 and the talent 230 moves to the left or right (e.g., if the talent 230 is walking or running or the like) outside of an acceptable vertical frame range for the vertical camera 20A, referred to herein as vertical camera non-pan range NPv, bounded by location points 302,304, then the vertical camera 20A would pan to keep the talent 230 within the vertical camera non-pan range NPv. The vertical non-pan range NPv is within the frame width Wv, bounded by location points 306,308, of the vertical camera 20A by a predetermined amount or percentage, e.g., NPv may be about 50% of the frame width Wv of the vertical camera 20A. Other values for NPv may be used if desired.

Similarly, if the talent 230 moves further to the left or right outside of an acceptable horizontal frame range, referred to herein as horizontal non-pan range NPh, bounded by location points 310,312, then the horizontal camera 20 would pan to keep the talent 230 within the horizontal non-pan range NPh. The horizontal non-pan range NPh is within the frame width Wh, bounded by location points 314,316, of the horizontal camera 20 by a predetermined amount or percentage, e.g., NPh may be about 60% of the frame width Wv of the vertical camera 20A. Other values for NPh may be used if desired.

Referring to FIG. 3B, regarding tilt control of the PTZ cameras 20,20A, if the cameras 20,20A are pointed at the talent 230 and the talent 230 moves up or down (e.g., if the talent 230 is climbing or descending a wall or jumping on a trampoline or changing from sitting to standing, or the like) outside of an acceptable horizontal frame range for the horizontal camera 20, referred to herein as horizontal camera non-tilt range NTh, bounded by location points 332,334, then the horizontal camera 20 would tilt to keep the talent 230 within the horizontal non-tilt range NTh. The horizontal camera non-tilt range NTh is within the frame height Hh, bounded by location points 334,336, of the horizontal camera 20A by a predetermined amount or percentage, e.g., NTh may be about 80% of the frame height Hh of the horizontal camera 20. Other values for NTh may be used if desired.

Similarly, if the talent 230 moves further to the up or down outside of an acceptable vertical frame range for the vertical camera 20A, referred to herein as vertical camera non-tilt range NTv, bounded by location points 340,342, then the vertical camera 20A would tilt to keep the talent 230 within the vertical camera non-tilt range NTv. The vertical camera non-tilt range NTv is within the frame height Hv, bounded by location points 344,346, of the vertical camera 20A by a predetermined amount or percentage, e.g., NTv may be about 50% of the frame height Hv of the vertical camera 20A. Other values for NTh may be used if desired.

Regarding zoom control of the PTZ cameras 20,20A, if the talent 230 moves toward or away from the cameras 20,20A, such that the current zoom setting makes the talent size outside of an acceptable vertical frame range for the vertical camera 20A, referred to herein as vertical camera non-zoom range NZv (not shown) where the talent becomes too large for the frame (when talent is moving closer to camera) or talent becomes too small for the frame (when talent moving away from the camera), then the vertical camera 20A would adjust the zoom to keep the talent 230 within the vertical camera non-zoom range NZv. The vertical non-zoom range NZv is within the frame width Wv and frame height Hv of the vertical camera 20A by a predetermined amount or percentage, e.g., NZv may be about 100% of the frame width Wv and frame height Hv of the vertical camera 20A. Other values for NZv may be used if desired. Note that for the vertical camera 20A, the default zoom setting may likely have the talent much larger in the screen than for the horizontal camera 20. Zoom may also be adjusted even if talent doesn't move, it may be desired to adjust the zoom to reframe the shot without moving the physical camera.

Similarly, if the talent 230 moves toward or away from the cameras 20,20A, such that the current zoom setting makes the talent size outside of an acceptable vertical frame range for the horizontal camera 20, referred to herein as horizontal camera non-zoom range NZh (not shown) where the talent (or the scene of interest) becomes too large for the frame (when talent is moving closer to camera) or talent (or the scene of interest) becomes too small for the frame (when talent moving away from the camera), then the horizontal camera 20A would adjust the zoom to keep the talent 230 within the horizontal camera non-zoom range NZh. The horizontal non-zoom range NZh is within the frame width Wh and frame height Hh of the horizontal camera 20 by a predetermined amount or percentage, e.g., NZh may be about 80% of the frame width Wh and frame height Hh of the horizontal camera 20. Other values for NZh may be used if desired. Note that for the horizontal camera 20A, the default zoom setting may likely have the talent (or the scene of interest) much smaller in the screen than for the vertical camera 20A.

Figure 9A:
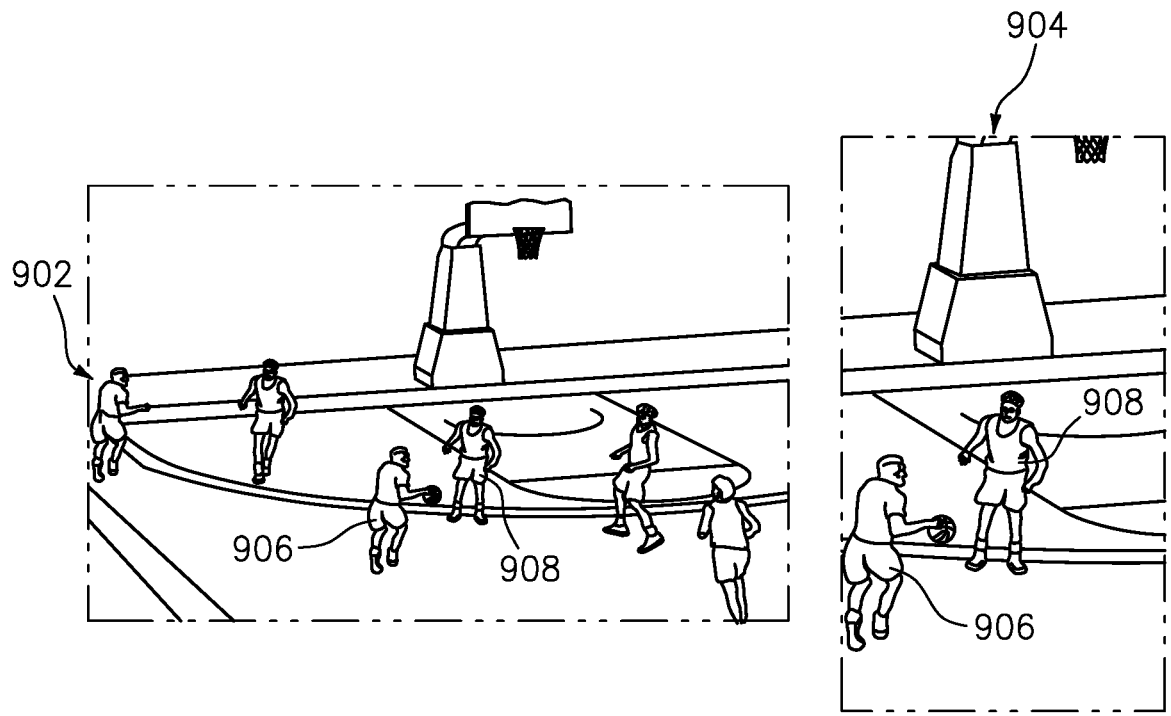
FIGS. 9A, 9B, 9C, 9D are side-by-side views of a vertical camera image and a horizontal camera image for different content captured using dual-mounted, aligned cameras with different orientations, in accordance with embodiments of the present disclosure.
Figure 9B:
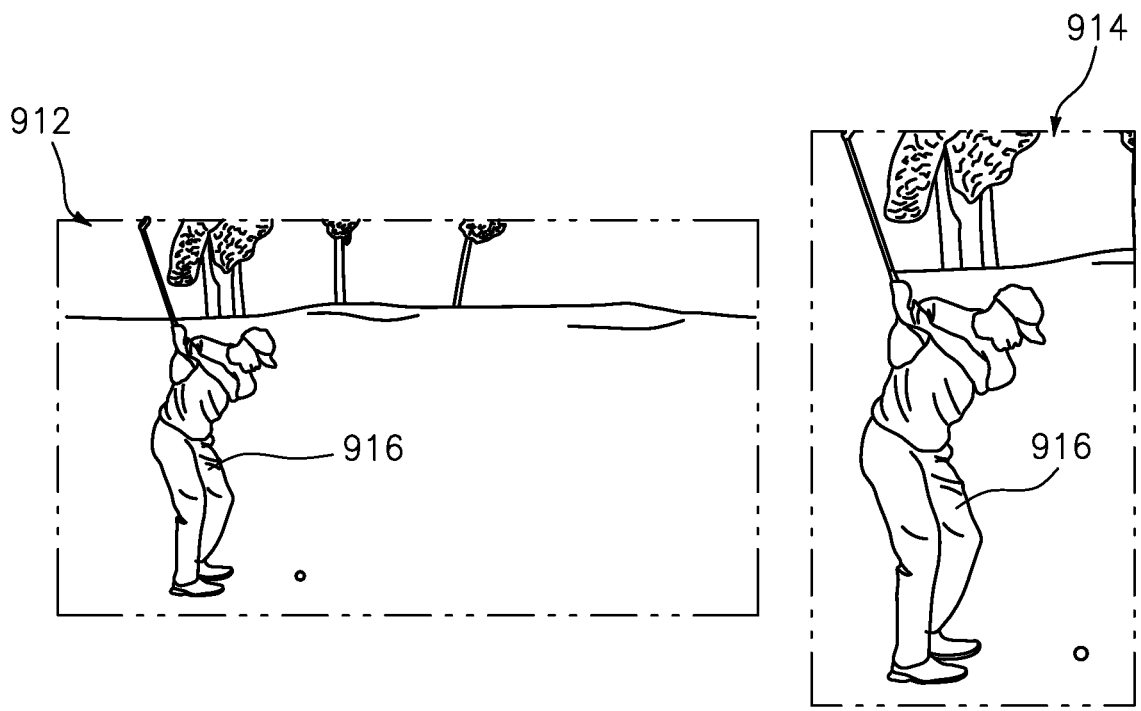

Also, the PTZ settings of the vertical camera and the horizontal camera may be based on what the desired location and appearance is for the talent's location in each image. For example, in some embodiments, the vertical camera image may be shifted (or panned) to the right, to cause the talent to be closer the left edge of the image frame (left of the vertical center line of the vertical frame), as shown in FIGS. 9A and 9B. Also, in some embodiments, the horizontal image may be shifted (or tilted) up, to cause the talent to be near the lower edge of the image frame (below the horizontal center line of the horizontal frame), as shown in FIGS. 9A and 9B. Also, in some embodiments, the talent in the vertical image may be larger size (zoomed-in) than the talent in the horizontal image, to allow the viewer to more closely view the talents position or actions, as shown in FIGS. 9A and 9B. Accordingly, the default PTZ positions (or values) for the vertical and horizontal camera frames may be other than 0 degrees (pan, tilt) and 1:1 zoom for both camera images.

In addition, as shown in FIGS. 3A and 3B, when the cameras are vertically aligned along a common vertical axis 34 (FIG. 1) the vertical center lines of the two image frames are common (FIG. 3A), and thus the pan setting for both cameras is the same (e.g., 0 deg, if the dual-camera assembly is positioned directly in front of the talent). Also, in that case, the horizontal camera (H-Cam) 20 and the vertical camera ((V-Cam) 20A are positioned at different heights (at different horizontal planes); thus, the horizontal camera (H-Cam) 20 may be positioned at eye-line 352, having a tilt of 0 deg. and the vertical camera ((V-Cam) 20A, position above the horizontal camera, is tilted down at −3.0 deg., to be focused on the same point 350 on the talent. Thus, the horizontal camera and vertical PTZ camera settings may be different.

Similarly, if cameras 20,20A are horizontally aligned at the same height (e.g., at eye-line of the talent) along a common horizontal axis (not shown), the horizontal center lines of the two camera image frames would be common, and thus the tilt setting for both cameras would be the same (e.g., 0 deg, if the dual-camera assembly is positioned directly in front of the talent, at eye-line). Also, in that case, the horizontal camera (H-Cam) 20 and the vertical camera ((V-Cam) 20A would be positioned at different positions along the common horizontal plane; thus, the horizontal camera (H-Cam) 20 may be positioned directly in front of the talent (like one camera in FIG. 3A), having a pan of 0 deg. and the vertical camera ((V-Cam) 20A, positioned to the left (or the right) of the horizontal camera, is panned to the right at, e.g., −3.0 deg. (or the left, e.g., +0.3 deg.), to be pointed at the same point on the talent. Thus, the horizontal camera and vertical PTZ camera settings may be different.

Figure 4:
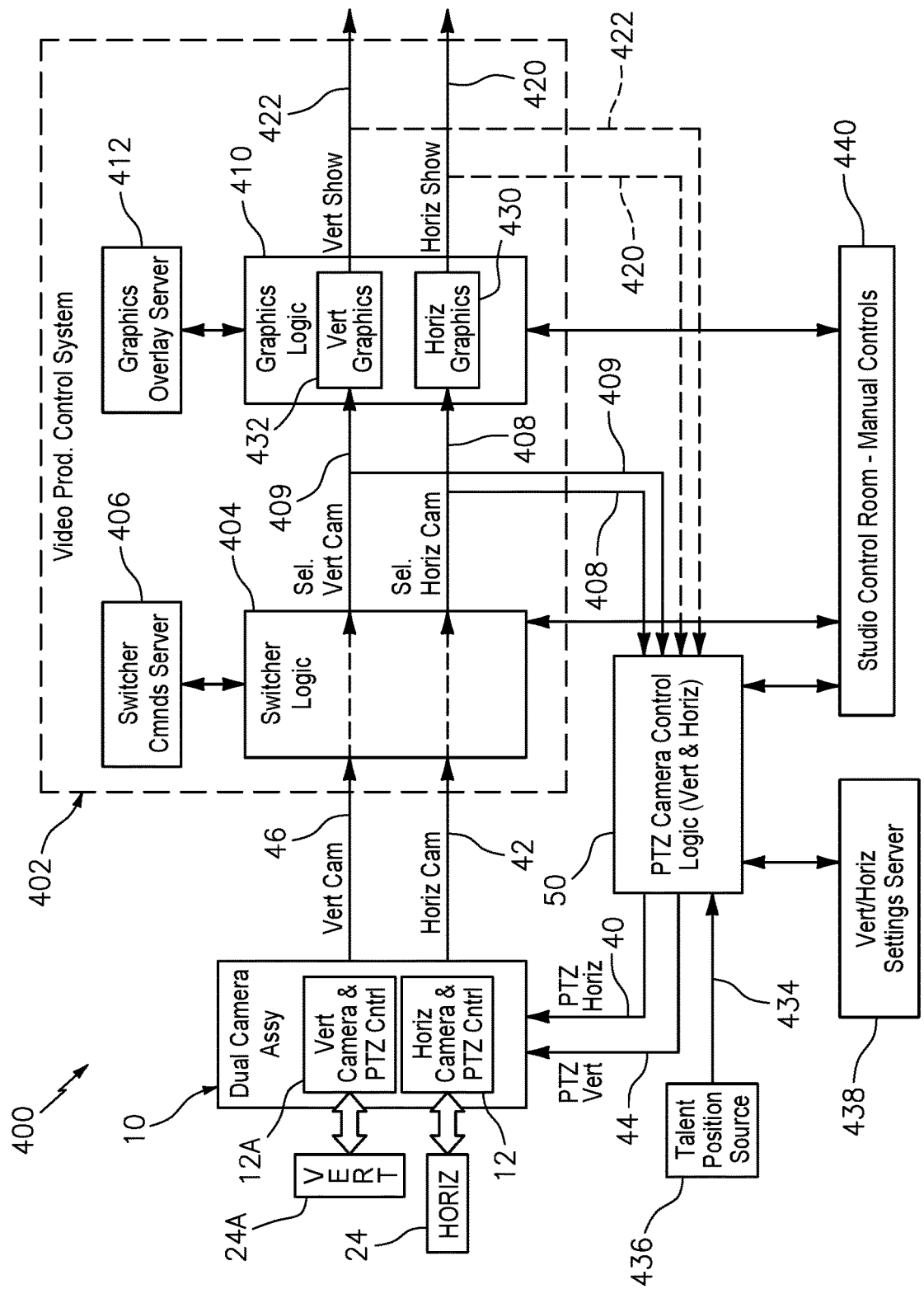
FIG. 4 is a top level block diagram of dual-mounted, aligned cameras with different orientations, in accordance with embodiments of the present disclosure.

Referring to FIG. 4, a closed-loop dual-camera orientation control system 400 is shown, having the dual-camera assembly 10 which provides the digital video output signals Horiz. Cam and Vert. Cam on lines 42,46, respectively, to a Video Production Control System 402, which handles switching or transitioning in/out the desired camera signal with a Video Switcher 404 and adding any desired graphics to the horizontal and vertical video signals (Horiz. Cam, Vert. Cam) with Graphics Logic 410, to provide desired vertical output video from the vertical camera unit 12A (Vert. Show) on a line 422, and desired horizontal output video from the horizontal camera unit 12 (Horiz. Show) on a line 420, which may be digitally stored on a server or broadcast or stream digitally live. In some embodiments, the video feeds from the horizontal and vertical cameras may be digital or analog video feeds, or generated as analog and converted to digital, and the camera positions controlled using the digital logic described herein, provided it meets the desired function and performance requirements of the application.

The Video Production Control System 402, may be any known production control system, such as an Ignite Automation Production Control (APC) system, made by Grass Valley. The Video Production Control System may include the video switcher 404, e.g., a 4K, UHD, or 1080p production switcher, which may include the Keyenne Video Production Center, the Karrera Video Production Center or the GV Korona Video Production Center, all made by Grass Valley. Any other video switcher may be used if desired. The video Switcher Logic 404 may communicate with a switcher commands server 406, which may have digitally stored switching commands for which camera to use and how to transition from one camera to another (discussed more hereinafter). The Video Switcher 404 provides the selected video signals from the selected vertical camera and the selected horizontal camera on lines 408,409 (Sel. Vert. Cam, Sel. Horiz. Cam) to the Graphics Logic 410. In some embodiments, if there is only one dual-camera unit shooting the video, the Switcher Logic 404 may not be needed or may be disabled.

The Graphics Logic 410 digitally adds (or overlays) predetermined graphics images (e.g., game score banner, game clock, player stats, name of player or name of TV analyst or show host or other graphics or visual information) onto the selected video signals from the horizontal or vertical video content, as needed, for a predetermined period of time, which may include Horizontal Graphics Logic 430, which adds graphics to the horizontal video signal, and Vertical Graphics Logic 430, which adds graphics to the vertical video signal. The Graphics Logic 410 may communicate with a Graphics Overlay Server 412, which may have digitally stored graphics or overlays or framing for each camera 20,20A to use and may also have instructions on when and how to use them. Also, each graphic may be specifically tailored to the shot orientation (horizontal or vertical). For example, a graphic may be inserted in only one view and not the other view, or it may have different size, position and formatting for it to viewed as desired in each view. Such information may also be stored in the Graphics Overlay Server 412.

The PTZ Camera Control Logic 50 receives the selected vertical video camera signal (Sel. Vert. Cam) on the line 409 and the selected horizontal video camera signal (Sel. Horiz. Cam) on the line 408 from the Switcher Logic 404 to provide video feedback sensing to control the Dual-Camera Assembly Set 10 by providing the PTZ Vert and PTZ Horiz signals on the lines 40,44, respectively, to keep the talent located in the desired location in the horizontal camera and the vertical camera image frames 24,24A, respectively, as discussed herein above with FIGS. 3A and 3B.

In some embodiments, the PTZ Camera Control Logic 50 may receive the output vertical video camera signal (Vert. Show) on the line 422 and the output horizontal video camera signal (Horiz. Show) on the line 420 from the Graphics Logic 410 to provide video feedback sensing to control the Dual-Camera Assembly Set 10 to keep the talent located in the desired location in the horizontal camera and the vertical camera image frames 24,24A, respectively, as discussed herein above with FIGS. 3A and 3B.

The PTZ Camera Control Logic 50 may also receive talent position data on a line 434, from a known talent position source 436, such as a real-time talent tracking system, which may include tracking sensors built into the camera units or external thereto, or computer vision software, or a real-time talent tracking system made by Black-Trax (e.g., Model AW-UE150, or the like), that provides real-time tracking data of the talent. Any type of talent tracking sensors or system may be used if desired.

The PTZ Camera Control Logic 50 may also communicate with a Vert/Horiz Settings Server 412, which may have digitally stored control parameters for each camera unit 12,12A for controlling the two camera units 12,12A simultaneously, in real-time, to maintain the desired framing, discussed more hereinafter.

The PTZ Camera Control Logic 50 may also communicate with a Studio Control Room 412 which may provide manual or automated input commands or data to the PTZ Camera Control Logic 50 to control the camera units 24,24A. In some embodiments, Studio Control Room 412 may have manual controls such as the PTZ joystick controls 52,54 (FIG. 1), which may be used to control or to trim or adjust the PTZ settings of the PTZ camera units 24,24A during filming of the video. The Studio Control Room 412 may also provide commands to the Switcher Logic 404 and the Graphics Logic 410, to add, remove, or adjust the switching, transitions, or graphics to provide the desired horizontal and vertical video outputs (Vert Show, Horiz Show).

Figure 5:
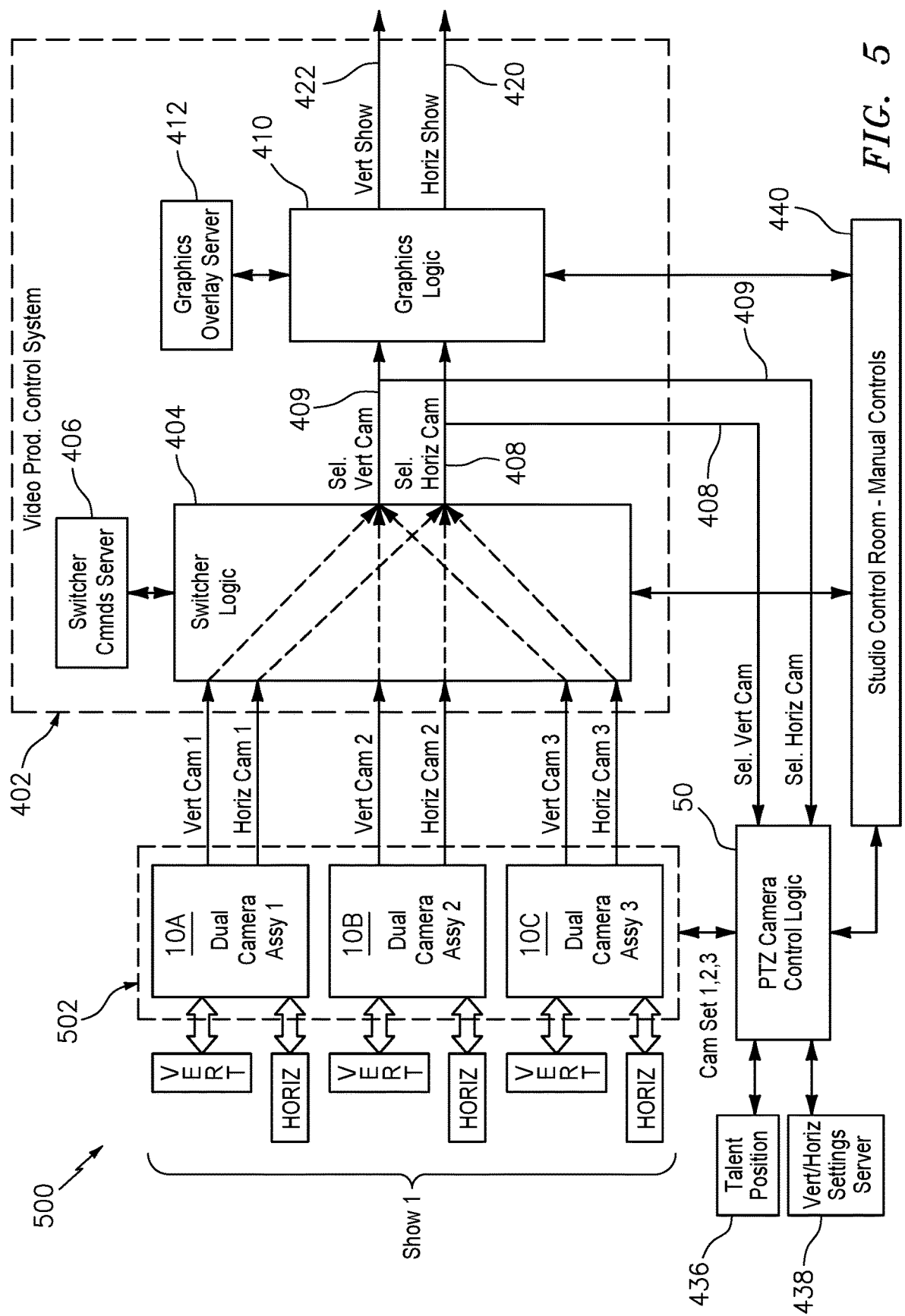
FIG. 5 is a top level block diagram of three dual-mounted, aligned cameras with different orientations, in accordance with embodiments of the present disclosure.

Referring to FIG. 5, a closed-loop dual-camera orientation control system 500 having a plurality of dual-camera assemblies 502 is shown, e.g., three dual camera assemblies 10A,10B,10C. Such an arrangement is typical for a studio show or interview, for example, where a first camera assembly 10A is pointed at one person, a second camera assembly 10B is pointed at a second person, and a third camera assembly 10C is pointed at both people in the studio set. Each of the dual camera assemblies 10A,10B,10C provides the digital video output signals Horiz. Cam and Vert. Cam, respectively, to the Video Production Control System 402, which handles switching or transitioning in/out the desired camera signal with a video switcher 404 and adding any desired graphics to the horizontal and vertical video signals (Horiz. Cam, Vert. Cam) for each of the camera assemblies 10A,10B,10C, to provide desired vertical output video (Vert. Show) on the line 422, and the desired horizontal output video (Horiz. Show) on the line 420, which may be digitally stored on a server or broadcast or streamed digitally live, similar to that described with FIG. 4.

The Video Production Control System 402 may be the same as that described in FIG. 4, and may include the video switcher 404, e.g., a 4K, UHD, or 1080p production switcher, which may include the Keyenne Video Production Center, the Karrera Video Production Center or the GV Korona Video Production Center, all made by Grass Valley. Any other video switcher may be used if desired. In this case, the video switcher 404 may communicate with a Switcher Commands Server 406, which may have digitally stored switching commands for which camera to use and how to transition from one dual-camera assembly to another. The video switcher 404 provides the selected video signals from the selected dual-camera assembly 10A,10B, or 10C, having selected vertical camera and the selected horizontal camera signals (Sel. Vert. Cam, Sel. Horiz. Cam) to the graphics logic 410 on lines 409,408, respectively.

As discussed herein, the graphics logic 410 adds predetermined graphics images to the horizontal or vertical video content, as needed, to become part of the horizontal or vertical video output content, for a predetermined period of time, and each graphic may be specifically tailored to the shot (horizontal or vertical) as described herein with FIG. 4. The graphics logic 410 may communicate with the Graphics Overlay Server 412, which may have digitally stored graphics overlays to use for each camera and each dual-camera assembly 10A,10B,10C and when and how to use them.

The PTZ Camera Control Logic 50 receives the selected vertical video camera signal (Sel. Vert. Cam) on the line 409 and the selected horizontal video camera signal (Sel. Horiz. Cam) on the line 408 from the Switcher Logic 404 to provide video feedback sensing to control the Dual-Camera Assembly 10 by providing the PTZ Vert and PTZ Horiz signals on the lines 40,44, respectively, to keep the talent located in the desired location in the horizontal camera and the vertical camera image frames 24,24A, respectively, as discussed herein above with FIGS. 3A and 3B.

The PTZ Camera Control Logic 50 may also receive talent position data on a line 434, from a known talent position source 436, and may also communicate with a Vert/Horiz Settings Server 412, which may have digitally stored control parameters for each dual-camera assembly 10A,10B, or 10C and for each camera unit 12,12A therein, for controlling the two camera units 12,12A simultaneously, in real-time, to maintain the desired framing, discussed more hereinafter.

The PTZ Camera Control Logic 50 may also communicate with a Studio Control Room 412 as described in FIG. 4 except the manual or automated input commands or data to the PTZ Camera Control Logic 50 control the camera units 24,24A for each dual-camera assembly 10A,10B, or 10C. The Studio Control Room 412 may also provide commands to the Switcher Logic 404 and the Graphics Logic 410, to add, remove, or adjust the switching, transitions, or graphics to provide the desired horizontal and vertical video outputs (Vert Show, Horiz Show).

The switcher logic 404 may receive commands from the control room 440 or from the Switcher Commands Server 402, or a combination of both, to decide which camera to switch to and how to do the transition between camera images, e.g., fade-in, fade-out, dissolve, or the like.

Referring to FIG. 6, a Camera Settings Table 600 is provided, which may be stored on the Vert/Horiz Settings Server 438. In particular, for each camera assembly 10A, 10B,10C, there are six columns 602 for the vertical camera unit (V-Cam) including three columns 604 for vertical camera default PTZ values for vertical camera, i.e., pan (DPv), tilt (DTv), and zoom (DZv) values, and three columns 606 for vertical camera range control values for the vertical camera, i.e., non-pan range (NPv), non-tilt range (NTv), and non-zoom range (NZv), as discussed herein above with FIGS. 3A, 3B. In addition, for each camera assembly 10A,10B,10C, there are six columns 608 for the horizontal camera unit (V-Cam) including three columns 610 for horizontal camera default PTZ values for the horizontal camera, i.e., pan (DPh), tilt (DTh), and zoom (DZh) values, and three columns 612 for the horizontal camera range control values for the horizontal camera, i.e., non-pan range (NPh), non-tilt range (NTh), and non-zoom range (NZh), as discussed herein above with FIGS. 3A, 3B.

The default values and control ranges may be different for each camera assembly 10A,10B,10C, depending on the location in the studio of each camera assembly relative to the talent and the set and the desired shot for each of the cameras 10A,10B,10C.

Figure 7:
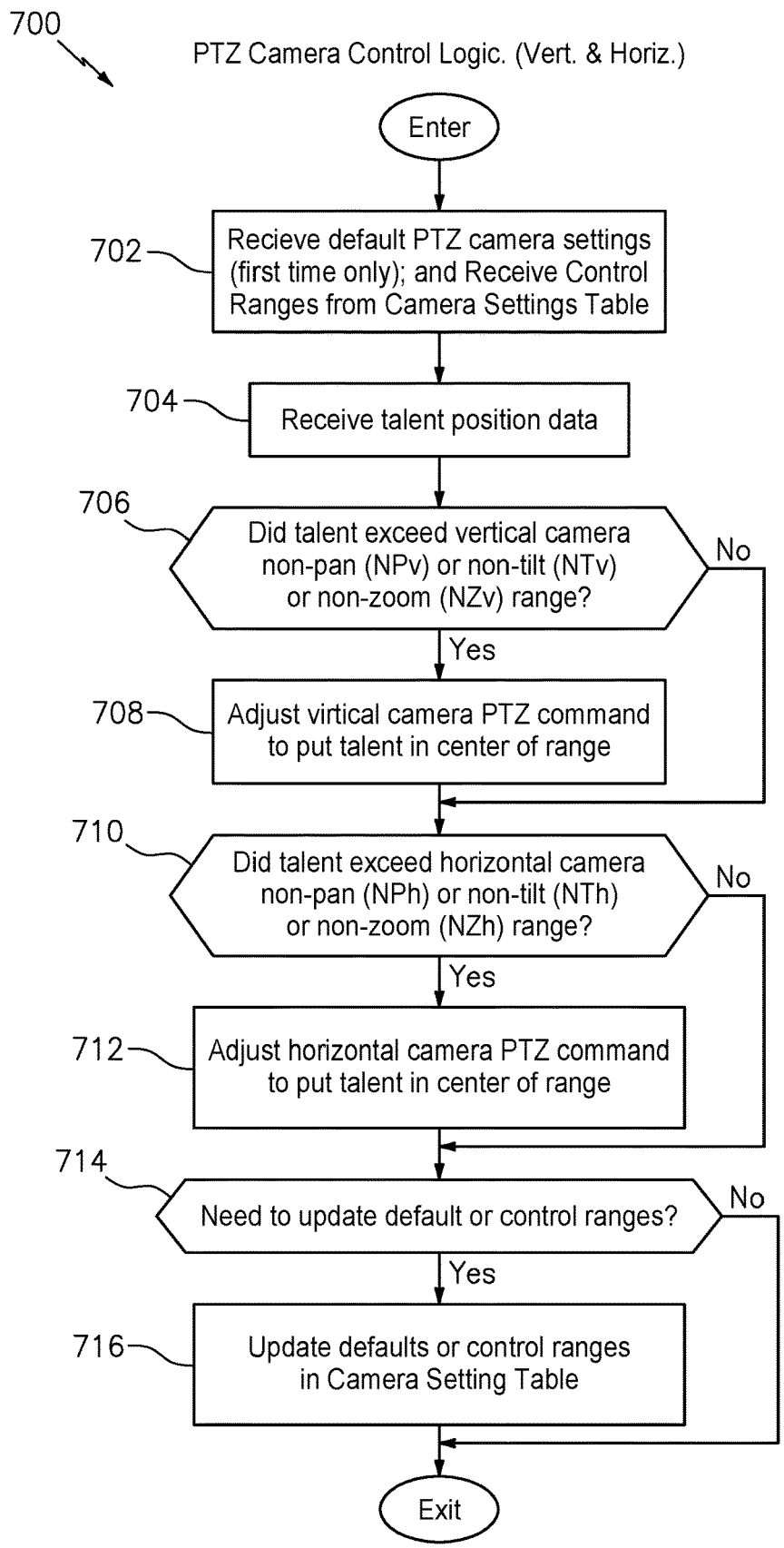
FIG. 7 is a flow diagram for operation of a control system, in accordance with embodiments of the present disclosure.

Referring to FIG. 7, a flow diagram 700 illustrates one embodiment of a process or logic for implementing the PTZ Camera Control Logic 50, which may be implemented in hardware, software, or firmware, or the like. The process/logic 700 begins at block 702 by receiving the PTZ default settings for the horizontal and vertical cameras 20,20A, including DPv, DTv, DZv for the vertical camera 20A and DPh, DTh, DZh for the horizontal camera 20 (first time through or if the values change) and the horizontal and vertical camera control ranges from the Camera Settings Table 600, including NPv, NTv, NZv for the vertical camera 20A and NPh, NTh, NZh for the horizontal camera 20. Next, block 704 receives data indicative of the talent position in the image frames 24,24A for the vertical and horizontal cameras 20,20A. The talent position may be obtained by receiving talent position data from the talent position source(s) 436 (e.g., talent sensors or the like discussed herein) and correlating the talent position to the image frames 24,24A for the vertical and horizontal cameras 20,20A, or may be obtained by receiving the video feedback signals (Sel. Horiz Cam, Sel. Vert. Cam) from the switcher 404 and identifying the talent position in the image frames 24,24A, using known computer vision software technology, or by other techniques.

Next, block 706 determines if the talent exceeded the vertical camera non-pan, non-tilt, non-zoom control ranges (NPv, NTv, NZv) for the vertical camera 20A. If Yes, block 708 adjusts the vertical camera PTZ commands to move the camera to put the talent in the center of the desired control range. Instead of putting the talent in the center of the image range, the logic may move the camera enough to keep the talent a desired distance (which may be pre-set or adjustable) within the non-pan, non-tilt, or non-zoom control ranges (NPv, NTv, NZv), as appropriate. Next, or if the result of block 706 is No, block 710 determines if the talent exceeded the horizontal camera non-pan, non-tilt, non-zoom control ranges (NPh, NTh, NZh) for the horizontal camera 20. If Yes, block 712 adjusts the horizontal camera PTZ commands to move the camera to put the talent in the center of the desired control range. Instead of putting the talent in the center of the image range, the logic may move the camera enough to keep the talent a desired distance (which may be pre-set or adjustable) within the non-pan, non-tilt, or non-zoom control ranges (NPv, NTv, NZv), as appropriate. Next, or if the result of block 710 is No, block 714 determines if the default values or control ranges need to be updated, e.g., based on new requirements or change in desired thresholds or scene changes. If Yes, the logic updates the default or control ranges in the Camera Settings Table 600 (FIG. 6). Next, or if the result of block 714 is No, the logic exits. The logic 700 is performed at a sample rate fast enough to ensure the talent is never out of the desired image frame 24,24A, for the respective cameras 20,20A. In some embodiments, the controller may only automatically control the pan and tilt angles (and not zoom) to be within the non-pan and non-tilt control ranges.

Accordingly, the automatic PTZ controls of the cameras are synchronized in real-time so that as the framing in one camera (e.g., vertical camera) is adjusted, the second camera (e.g., horizontal camera) adjusts appropriately, but only when necessary to maintain the desired framing for that camera. Thus, a camera is moved (e.g., panned or tilted) when the talent exceeds a control range threshold for that camera, independent of the talent location in the other camera image. In particular, the two cameras are controlled independently in real-time in response to the talent location, such that the horizontal camera is moved by the controller in response to the talent location when the talent location exceeds a horizontal camera control range threshold for the horizontal camera, independent of the talent location in the vertical image, and the vertical camera is moved by the controller in response to the talent location when the talent location exceeds a vertical camera control range threshold for the vertical camera, independent of the talent location in the horizontal image.

In some embodiments, the known computer vision for talent tracking may be incorporated into the horizontal (landscape) camera which may be used to provide tracking/feedback to the control logic 50 (or directly to the other camera) to cause the vertical (portrait) camera to automatically track the talent as the talent moves across the frame or sways or moves from side-to-side in the vertical image frame.

Figure 8:
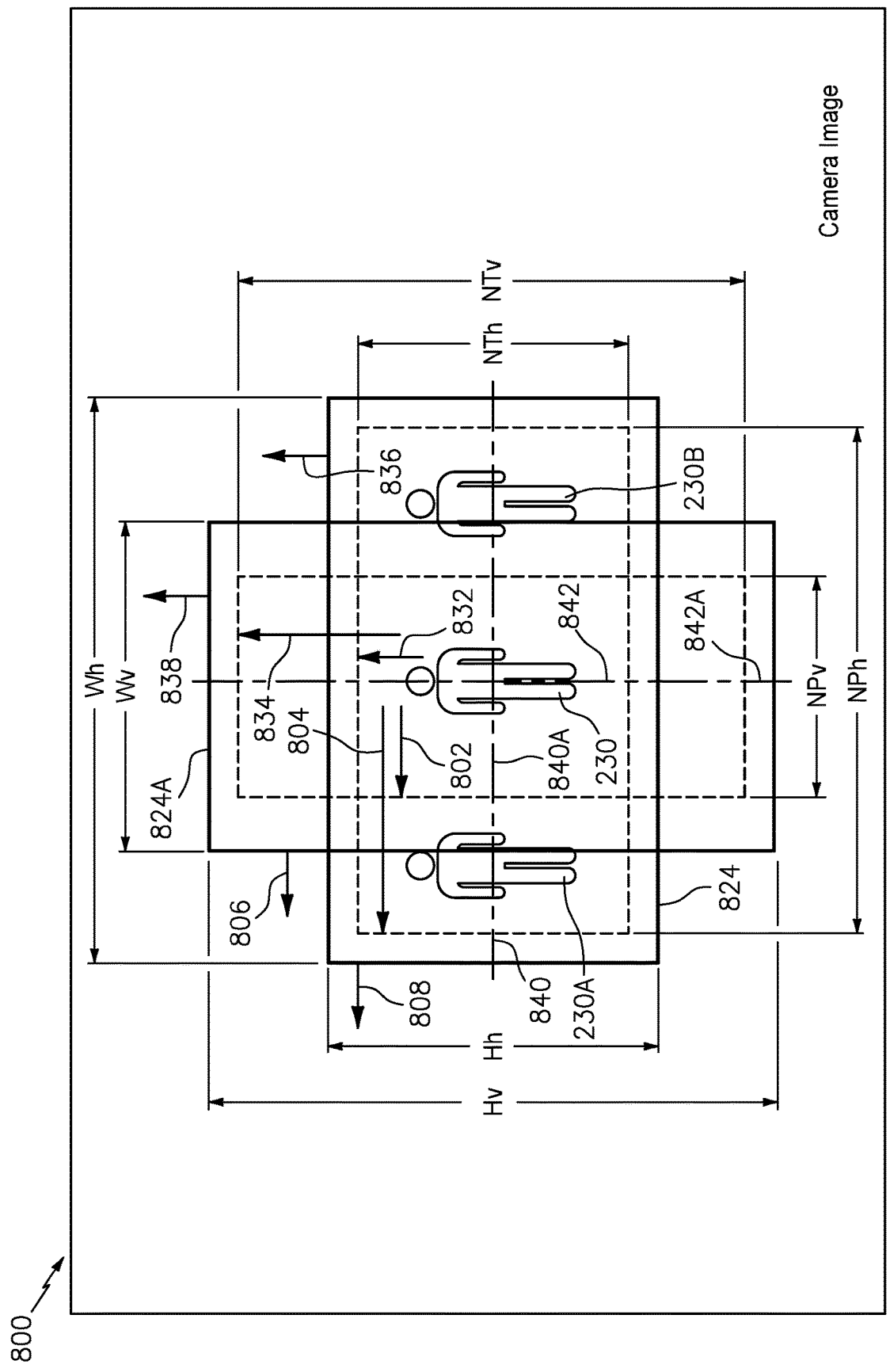
FIG. 8 is a screen illustration of a high resolution image showing selective, moving image extraction (cropping) to obtain two simultaneous image frames different orientations, in accordance with embodiments of the present disclosure.

Referring to FIG. 8, in some embodiments, instead of using two separate cameras with image frames having major axes oriented 90 degrees apart and aligned along a common camera axis, a single high resolution camera, e.g., Panasonic 8K ROI (Region of Interest) video camera system or a 4K ROI HD/or UHD video camera system having sufficient resolution to meet the desired video image requirements, may be used to obtain a single high resolution image/video 800, and then software sub-sampling and image extraction (or image cropping) may be used to create the separate horizontal and vertical video streams (or feeds). Other high resolution or HD or UHD cameras may be used if desired, provided they provide the sufficient amount of resolution or granularity, e.g., when shots need to be enlarged (or zoomed-in) for desired imaging effects. In that case, separate image frame controls are still needed for the two video streams (horizontal and vertical), providing real-time pan and tilt synchronization and control of the horizontal and vertical extracted images, as described herein above for controlling with the two cameras 20,20A based on talent position. This embodiment may also use the known computer vision or talent tracking sensors to track the talent 230 as discussed herein, and the same control logics discussed herein may be used to provide control (e.g., pan or left-right or horizontal motion and tilt or up-down or vertical motion) of each image frame (or moving image extraction frame or window). Examples of 4K HD ROI video camera systems that allow for static (or fixed), horizontal-only image frames, ROI extraction from a captured image include: Roland V-600 UHD 4K HDR, AJA TruZoom real-time 4K, and Titan HD Extract 4K. In some embodiments, such fixed, horizontal-only image frames, ROI systems may be modified to provide the subject-tracking, dual image frame control functions described herein and to add the dual-orientation horizontal and vertical image frames, if desired.

In particular, the high resolution image 1000 is shot and cropped (or extracted) at different sizes/orientations from the image 1000 to obtain the vertical and horizontal image frames 824,824A, similar to the vertical and horizontal image frames 24,24A (FIG. 1) provided by the two cameras 20,20A described herein. The image 800 also shows additional subjects (or talent) 230A,230B, which partially appear in the vertical frame 824A and appear fully in the horizontal frame 824. The image frames 824,824A for this embodiment represent the image extraction regions for the horizontal and vertical images, respectively. The horizontal image frame 824 has a horizontal center major axis 840 and a vertical center minor axis 842, and the vertical image frame 824A has a vertical center major axis 842A and a horizontal center minor axis 840A. In FIG. 8 the vertical and horizontal image frames are centered on each other, and the center lines for the major and minor axes of the two image frames overlap.

If the talent 230 moves to the left, shown by an arrow 802, the vertical image extraction region 824A remains unchanged, as long as the talent 230 remains in the vertical non-pan range (NPv). When the talent 230 moves left past the NPv range, the vertical image extraction region 824A moves to the left, as shown by an arrow 806 (similar to the vertical camera 20A panning left, as described herein above). However, the horizontal image extraction region 824 remains unchanged as long as the talent 230 stays within the horizontal non-pan range NPh, as shown by an arrow 804. When the talent 230 moves left past the NPh range, the horizontal image extraction region 824 moves to the left, as shown by an arrow 808 (similar to the horizontal camera 20 panning left, as described herein above). In that case, both the horizontal extraction region 820 and the vertical extraction region 824A would be moving as the talent moves further left. A similar effect occurs for when the talent 230 moves to the right.

Similarly, if the talent 230 moves upward (e.g., when climbing a wall or climbing stairs or transitioning sitting/standing), shown by an arrow 810, the horizontal image extraction region 824 remains unchanged, as long as the talent 230 remains in the horizontal non-tilt range (NTh). When the talent 230 moves left past the NTh range, the horizontal image extraction region 824 moves upward, as shown by an arrow 836 (similar to the horizontal camera 20 tilting upward, as described herein above). However, the vertical image extraction region 824A remains unchanged as long as the talent 230 stays within the vertical non-tilt range NTv, as shown by an arrow 834. When the talent 230 moves upward past the NTv range, the vertical image extraction region 824A moves upward, as shown by an arrow 838 (similar to the vertical camera 20A tilting upward, as described herein above). In that case, both the horizontal extraction region 820 and the vertical extraction region 824A would be moving up as the talent moves further upward. A similar effect occurs for when the talent 230 moves downward.

The location of the vertical image relative to the horizontal image may be based on what the desired appearance is for the talent's location in each image. In some embodiments, an initial or default position for the two image frames may overlap (at least partially) and may have the same center point (symmetrical position of two image frames), e.g., where perpendicular center major axes 840,842A, for the horizontal frame 824 and vertical frame 824A, respectively, meet. In that case, the center minor axis of one image frame and center major axis of the other image frame are common (or overlap), as shown in FIG. 8. However, in some embodiments, the horizontal and vertical image frames locations may be asymmetrical along one axis or on both of the center axes 840,842. For example, in some embodiments, the vertical image may be shifted (or panned) to the right, to cause the talent to be closer the left edge of the image frame (left of the vertical center line 842 of the vertical frame).

Also, in some embodiments, the horizontal image may be shifted (or tilted) up, to cause the talent to be near the lower edge of the image frame (below the horizontal center line 840 of the horizontal frame). Accordingly, the default positions (or values) for the vertical and horizontal camera frames may be other than 0 degrees for both image frames (e.g., analogous to the default pan and tilt conditions for when two cameras are used, as discussed herein above).

FIG. 8 may also be viewed as an illustration of the horizontal and vertical camera image frames 24,24A superimposed over each other, and with the two cameras 20,20A having the same zoom setting. The motion of the moving extraction or cropping frames 824,824A, would be the same as moving the image frames 24,24A in response to panning or tilting the respective camera when the talent reaches the acceptable edge of the frames, i.e., the non-pan (NPh, NPv) and the non-tilt (NTh, NPv) ranges.

Referring to FIGS. 9A, 9B, 9C, 9D, side-by-side views of a vertical camera image and a horizontal camera image (Vert Show, Horiz Show) for different content captured using dual-mounted, aligned cameras with different orientations, is shown.

Referring to FIG. 9A, side-by-side views of a horizontal camera image 902 (Horiz Show) and vertical camera image (Vert Show) 904 of a basketball game video is shown. In that case, the horizontal image 902 shows the main talent 906 with the ball and the team around him, and the vertical image 904 shows a zoomed-in vertical version of the main talent 906 and his defender 908.

Referring to FIG. 9B, side-by-side views of a horizontal camera image 912 (Horiz Show) and vertical camera image (Vert Show) 914 of a golf shot video is shown. In that case, the horizontal image 912 shows the main talent 916 in mid-swing winding up to hit the golf ball and also shows the full fairway and the target location for the ball. The vertical image 914 shows a zoomed-in vertical version of the main talent 916 and the ball.

In FIGS. 9a and 9B, the top of the top of the horizontal image (not-zoomed or less-zoomed) is approximately the same height as the vertical image 904 (zoomed). This shows how the two views can be optimized using different zoom settings for the two cameras 20,20A to get the desired effect. In this case, showing a more detailed image of the main talent, allowing closer viewing of the talent.

Figure 9C:
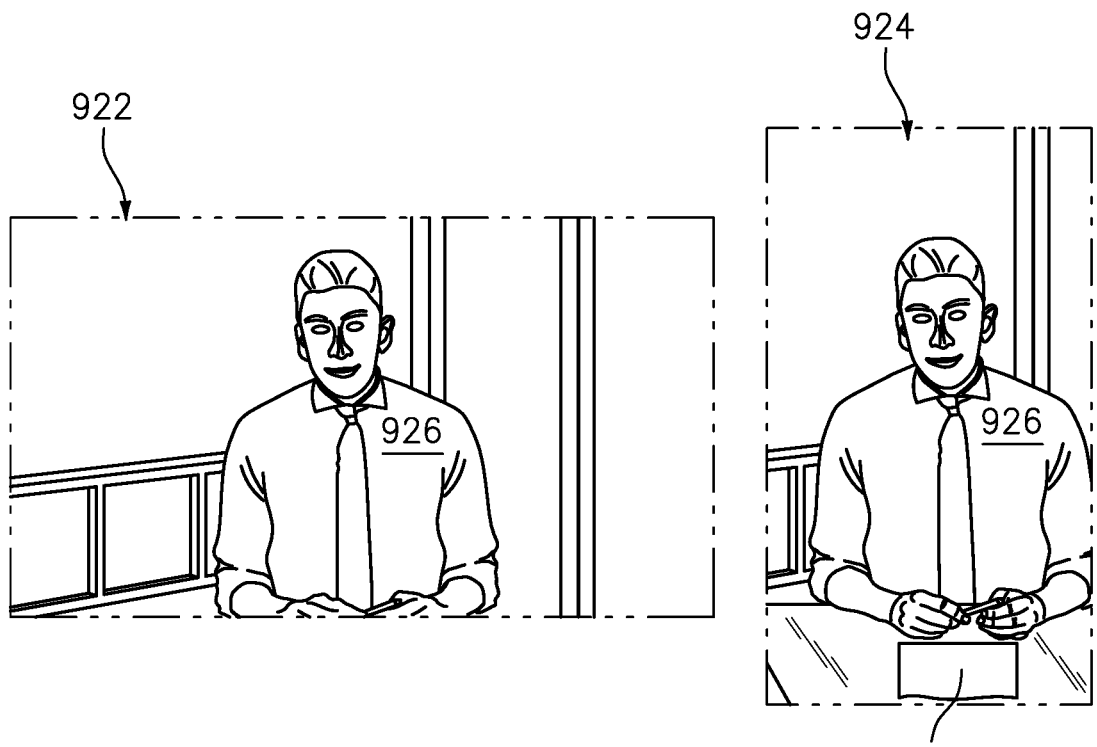

Referring to FIG. 9C, side-by-side views of a horizontal camera image 922 (Horiz Show) and vertical camera image (Vert Show) 924 of a talk show video is shown. In that case, the horizontal image 922 shows the talent 926 slightly left of center on the horizontal image 922 and surrounded by the studio set on both sides. The vertical image 924 shows the talent 926, having the same zoom setting as the horizontal image 922, and showing more of the vertical frame that was cut-off in the horizontal image 922, such as a table top, the talent's hands and papers 930 on the table, and the studio set above the talent's head. This shows how the two views 922,924 can be optimized using the same zoom settings for the two cameras 20,20A to obtain a desired effect. In this case, showing more vertical content.

Figure 9D:
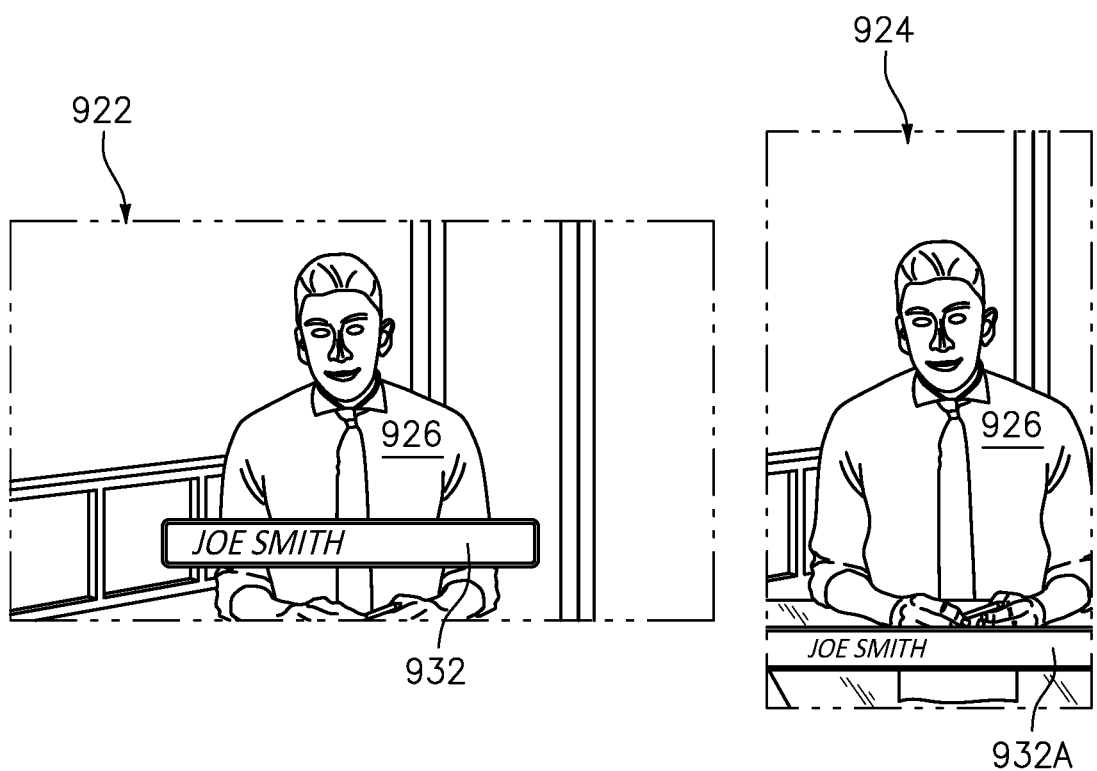

Referring to FIG. 9D, side-by-side views of a horizontal camera image 922 (Horiz Show) and vertical camera image (Vert Show) 924 of the same talk show video shown in FIG. 9C, except that there are graphic overlays 932, 932A of the talent's name added to both the horizontal image 922 and the vertical image 924, respectively. The graphics or other digital imaging features may be provided on one or both images, and may be scaled and positioned differently for each image. In particular, in this example, the graphic 932 in the horizontal image 922 is slightly larger height and width than the graphic 932A in the vertical image 924. Also, the graphic 932 is positioned above the talent's hands in the horizontal image 922 and the graphic 932A is positioned below the talent's hands in the vertical image 924.

Figure 10:
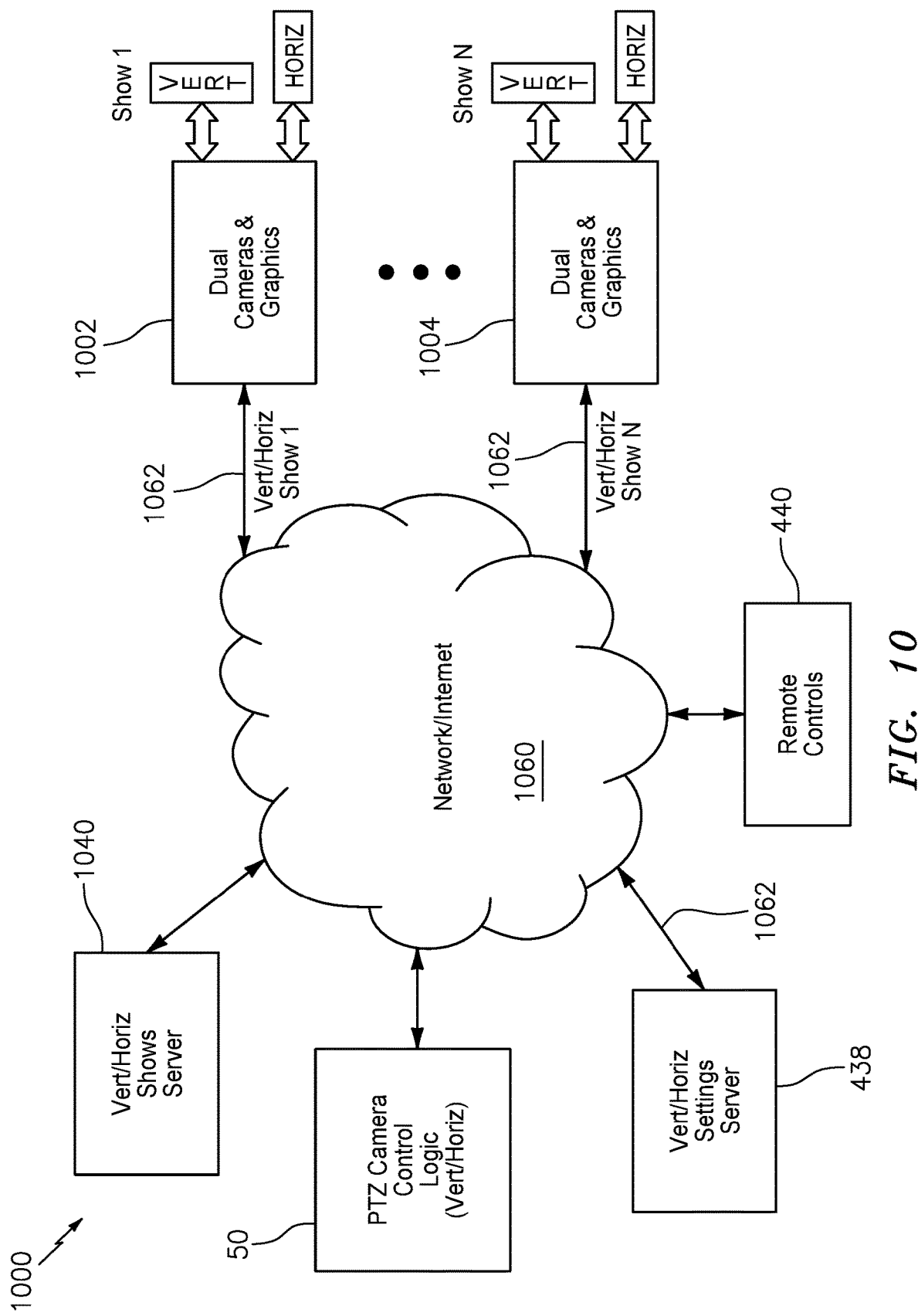
FIG. 10 is a block diagram of various components of the system of FIG. 1, FIG. 4 and FIG. 5 connected via a network, in accordance with embodiments of the present disclosure.

Referring to FIG. 10, the present disclosure may be implemented in a network environment 1000. In addition, a plurality of different shows (Show1-ShowN) may be provided and controlled remotely in a network environment. In particular, various components of an embodiment of the system of the present disclosure include a plurality of dual-camera & graphics systems 1002-1004 similar to the system 500 of FIG. 5, each providing a dual-camera based video show (Show 1-Shown N). In particular, one or more of the systems 1002-1004, may be connected to or communicate with each other through a communications network 1060, such as a local area network (LAN), wide area network (WAN), virtual private network (VPN), peer-to-peer network, or the internet, wired or wireless, as indicated by lines 1062, by sending and receiving digital data over the communications network 1060. In some embodiments, each of the dual camera assemblies 10 may be connected to the network 1060 and controlled remotely. Also, each of the systems 1002-1004 may store the shows on a Vert/Horiz Shows Server 1040 via the network 1060.

Also, the PTZ Camera control logic 50, the Vert/Horiz Settings Server 438 and Remote Controls, such as some or all of the Studio Control Room Remote Controls 440 may also communicate via the network 1060. The servers described herein may be any type of computer server with the necessary software or hardware (including storage capability) for performing the functions described herein. Also, the servers (or the functions performed thereby) may be located, individually or collectively, in a separate server on the network 1060. In addition, the video feedback signals (e.g., Sel. Vert./Horiz. Cam signals), may communicate via the network 1060 and with the PTZ Camera Control Logic 50, and with any other network-enabled devices or logics as needed to provide the functions described herein.

In some embodiments, the present disclosure may also be used in the telecommuting educational world for streaming professor lectures. In that case, the horizontal or landscape-oriented shot may have professor and white/black board and the vertical or portrait-orientated shot may be a tight shot of professor without showing the backboard, for maximum visual electronic engagement with student.

In some embodiments, the two-camera dual-orientation assembly is easily portable and may be used for certain sports shows at large events, e.g., Super Bowl, Final Four, World Series, or the like, or at smaller events as a "Do All" camera assembly/system that could service all the on-camera needs for the digital content streams and the required mix of orientation formats in a very small form-factor that requires minimal staffing and could be controlled remotely, using a remote-integration model, or "REMI", style set-up. For applications where only a single camera may be needed, the horizontal or landscape camera may be used by itself and for applications that may require only a vertical video camera, the vertical or portrait camera may be used, and for applications where both horizontal and vertical video feeds are required, both the horizontal and vertical cameras may be used.

Although the disclosure has been described with the vertical camera positioned above the horizontal camera, it should be understood by those skilled in the art that they may be reversed, such that the horizontal camera is on top and the vertical camera is on the bottom. Also, instead of aligning the two cameras along a common vertical axis, they may be aligned along a common horizontal axis, in either order, e.g., vertical camera on the left and horizontal camera on right, or vice versa. Also, other angles for the common camera alignment axis 34 (FIG. 1), e.g., a straight line between the center of the camera lenses, may be used that are different from horizontal (0 deg.) and vertical (90 deg, shown in FIG. 1), if desired, provided it provides the desired visual effect, e.g., the common camera alignment axis may be any angle between 0-90 degrees or between 0-360 degrees, if desired, provided the visual images are acceptable for the application. In the above cases, the default (or initial) PTZ (pan, tilt, zoom) settings for the PTZ cameras may be different for each dual-camera assembly (or image frames), but the synchronization/control principles for the two cameras 20,20A (or two image frames) described herein would be the same with appropriate adjustments for convention and orientation.

For any of the embodiments herein, the output video may be a video feed from the respective cameras, either in real-time, e.g., real-time online streaming over the internet or other network, or broadcast over airwaves, or digitally stored for viewing at a later time (where appropriate or practical). Independent of the angle of the common camera alignment axis, to reduce the risk of eye-line separation, the two cameras should be placed as close as physically possible, i.e., minimize camera spacing Dc, and center lens separation distance Lc, while permitting them to pan and tilt over the desired range. Also, the camera shoot distance Ds may be adjusted to reduce, minimize or avoid eye-line separation, as discussed herein. Also, as described herein, the subject or talent may be a person, animal or object such as a sports object (e.g., a ball, puck, frisbee, dart, bean bag, stick, shuttlecock, or the like) or other object in the scene that is desired to be tracked.

The system, computers, servers, devices, logic and the like described herein have the necessary electronics, computer processing power, interfaces, memory, hardware, software, firmware, logic/state machines, databases, microprocessors, communication links (wired or wireless), displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general-purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, mobile communication devices, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, functions, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A system for providing a rectangular horizontal image and a rectangular vertical image of a common scene simultaneously and on separate horizontal and vertical image feeds, comprising:
   a movable horizontal camera configured to pan and tilt in response to control commands and configured to provide the horizontal image on a horizontal image feed;
   a movable vertical camera configured to pan and tilt in response to control commands and configured to provide the vertical image on a vertical image feed;
   the horizontal camera and the vertical camera configured to be aligned along a common camera axis and rigidly mounted to a common support and configured to have a predetermined camera spacing distance between the cameras sufficient to allow the cameras to independently perform pan and tilt movements; and
   the horizontal camera and the vertical camera configured to both view at least a portion of the common scene and are configured to provide the horizontal and vertical image feeds simultaneously.

2. The system of claim 1, further comprising:
   a subject tracking sensor configured to track subject location in the common scene in real-time; and
   a camera controller configured to independently control the horizontal and vertical cameras in real-time in response to the subject location, such that the horizontal camera is moved by the controller in response to the subject location when the subject location exceeds a horizontal camera control range threshold for the horizontal camera, independent of the subject location in the vertical image, and the vertical camera is moved by the controller in response to the subject location when the subject location exceeds a vertical camera control range threshold for the vertical camera, independent of the subject location in the horizontal image.

3. The system of claim 2, wherein the horizontal camera is a PTZ camera and the horizontal camera control range threshold comprises a horizontal camera non-pan range, a horizontal camera non-tilt range, and a horizontal camera non-zoom range.

4. The system of claim 3, wherein the horizontal camera non-pan range, the horizontal camera non-tilt range are a predetermined amount smaller than a horizontal camera image size.

5. The system of claim 2, wherein the vertical camera is a PTZ video camera and the vertical camera control range threshold comprises a vertical camera non-pan range, a vertical camera non-tilt range, and a vertical camera non-zoom range.

6. The system of claim 5, wherein the vertical camera non-pan range, the vertical camera non-tilt range are a predetermined amount smaller than a vertical camera image size.

7. The system of claim 1, wherein the horizontal image comprises a horizontal image frame height Hh and width Wh, and the vertical image comprises a vertical image frame height Hv and width Wv, and wherein the height Hv of the vertical image is greater than the height Hh of the horizontal image, and the width Wv of the vertical image is less than the width Wh of the horizontal image.

8. The system of claim 1, wherein the horizontal image and the vertical image each having a major axis and a minor axis, wherein the major axis of the vertical image is perpendicular to the major axis of the horizontal image, and wherein the major axis of the vertical image and the minor axis of the horizontal image are aligned along the common camera axis.

9. The system of claim 1, wherein the common camera axis is a vertical axis passing through a panning motion pivot point on each camera.

10. The system of claim 1, wherein the horizontal camera is a PTZ camera configured to receive horizontal PTZ commands which controls pan, tilt and zoom of the horizontal camera.

11. The system of claim 1, wherein the vertical camera is a PTZ camera configured to receive vertical PTZ commands which controls pan, tilt and zoom of the vertical camera.

12. The system of claim 1, wherein the common support is configured to pan and tilt the horizontal and vertical cameras together.

13. The system of claim 1, wherein the camera spacing distance is about 1 to 1.5 inches.

14. The system of claim 1, wherein the cameras have a center lens separation distance, defining an acceptable camera shooting distance to minimize subject eye-line separation.

15. The system of claim 14, wherein the camera shooting distance is at least 6 feet.

16. The system of claim 1, wherein pan and tilt commands for the vertical camera are configured such that a tilt command causes the subject image to move up and down on a vertical image screen as seen by a camera operator and a viewing audience.

17. The system of claim 1, wherein pan and tilt commands for the vertical camera are configured such that a tilt command causes the subject image to move up and down on a vertical image screen rotated 90 degrees as seen by a camera operator and causes the subject image to move up and down on a vertical image screen as seen by a viewing audience.

18. A method for providing a rectangular horizontal image and a rectangular vertical image of a common scene simultaneously and on separate horizontal and vertical image feeds, comprising:
providing a movable horizontal camera configured to pan and tilt in response to control commands and configured to provide the horizontal image on a horizontal image feed;
providing a movable vertical camera configured to pan and tilt in response to control commands and configured to provide the vertical image on a vertical image feed;
rigidly mounting the horizontal camera and the vertical camera to a common support so the cameras are aligned along a common camera axis and have a predetermined camera spacing distance between the cameras sufficient to allow the cameras to independently perform pan and tilt movements, the horizontal image and the vertical image each having a major axis and a minor axis, the major axis of the vertical image being perpendicular to the major axis of the horizontal image; and
arranging the horizontal camera and the vertical camera to both view at least a portion of the common scene and to provide the separate horizontal and vertical image feeds simultaneously.

19. The method of claim 18, further comprising:
tracking subject location in the common scene in real-time; and
independently moving the position of the horizontal camera and the vertical camera in real-time in response to the subject location, such that the horizontal camera is moved in response to subject movement when the subject exceeds a horizontal camera control range threshold for the horizontal camera, independent of the subject location in the vertical image, and the vertical camera is moved in response to subject movement when the subject exceeds a vertical camera control range threshold for the vertical camera, independent of the subject location in the horizontal image.

20. The method of claim 18, wherein the major axis of the vertical image and the minor axis of the horizontal image are aligned along the common camera axis.

21. The method of claim 18, wherein the common camera axis is a vertical axis through a pivot point for the panning motion of each camera.

22. The method of claim 18, wherein the camera spacing distance is about 1 to 1.5 inches.

23. The method of claim 18, wherein the cameras have a center lens separation distance, defining an acceptable camera shooting distance to minimize subject eye-line separation.

24. The method of claim 23, wherein the camera shooting distance is at least 6 feet.

25. A method for providing a rectangular horizontal image and a rectangular vertical image of a common scene simultaneously and on separate horizontal and vertical image feeds, comprising:
capturing a high resolution image of the common scene;
extracting a vertical image from the high resolution image;
extracting a horizontal image from the high resolution image;
the vertical and horizontal images each having a rectangular shape and having a major axis and a minor axis, the major axis of the vertical image being perpendicular to the major axis of the horizontal image, the horizontal image and the vertical image at least partially overlapping, the position of the images within the high resolution image being based on a location of a subject;
performing the extracting of the vertical and horizontal images simultaneously, and providing the vertical image and horizontal image on separate horizontal and vertical image feeds simultaneously; and
independently moving the position of the horizontal image and the vertical image in real-time in response to real-time subject location in the scene, such that the horizontal image is moved in response to the subject location when the subject location exceeds a horizontal image control range threshold for the horizontal image, independent of the subject location in the vertical image, and the vertical image is moved in response to the subject location when the subject location exceeds a vertical image control range threshold for the vertical image, independent of the subject location in the horizontal image.

26. The method of claim 25, wherein the horizontal image control range threshold comprises a horizontal image non-pan range and a horizontal image non-tilt range.

27. The method of claim 26, wherein the horizontal image non-pan range and the horizontal image non-tilt range are a predetermined amount smaller than a horizontal image frame size.

28. The method of claim 25, wherein the vertical image control range threshold comprises a vertical image non-pan range and a vertical image non-tilt range.

29. The method of claim 28, wherein the vertical image non-pan range and the vertical image non-tilt range are a predetermined amount smaller than a vertical image frame size.

30. The method of claim 25, wherein the horizontal image comprises a rectangular horizontal image frame height Hh and width Wh, and the vertical image comprises a rectangular vertical image frame height Hv and width Wv, and wherein the height Hv of the vertical image is greater than the height Hh of the horizontal image, and the width Wv of the vertical image is less than the width Wh of the horizontal image.

31. The method of claim 25, wherein the horizontal image and the vertical image overlap and have the same center point.

* * * * *